United States Patent
Cannillo et al.

(10) Patent No.: US 11,848,612 B2
(45) Date of Patent: Dec. 19, 2023

(54) HYBRID BUCK-BOOST POWER CONVERTER

(71) Applicant: Dialog Semiconductor (UK) Limited, London (GB)

(72) Inventors: Francesco Cannillo, Munich (DE); Marco Ruggeri, Haar (DE)

(73) Assignee: Dialog Semiconductor (UK) Limited, London (GB)

( * ) Notice: Subject to any disclaimer, the term of this patent is extended or adjusted under 35 U.S.C. 154(b) by 0 days.

(21) Appl. No.: 17/409,033

(22) Filed: Aug. 23, 2021

(65) Prior Publication Data

US 2022/0286051 A1 Sep. 8, 2022

(30) Foreign Application Priority Data

Mar. 5, 2021 (DE) .......................... 102021202137.9

(51) Int. Cl.
*H02M 3/158* (2006.01)
*H02M 1/00* (2006.01)

(52) U.S. Cl.
CPC ....... *H02M 3/1582* (2013.01); *H02M 1/0009* (2021.05); *H02M 1/0095* (2021.05)

(58) Field of Classification Search
CPC ............. H02M 1/0009; H02M 1/0095; H02M 3/1582; H02M 3/155; H02M 3/1552; H02M 3/1557; H02M 3/156; H02M 3/1566

See application file for complete search history.

(56) References Cited

U.S. PATENT DOCUMENTS 8,854,019 B1    10/2014 Levesque et al.
10,476,390 B2   11/2019 Petersen
(Continued)

FOREIGN PATENT DOCUMENTS

DE   10 2015 224 476 A1   6/2017
DE   10 2019 113 519 A1   5/2020

OTHER PUBLICATIONS

"A Simple Hybrid 3-Level Buck-Boost DC-DC Converter with Efficient PWM Regulation Scheme," by Abdullah Abdulslam et al., 2015 IEEE International Conference on Electronics, Circuits, and Systems (ICECS), Dec. 6-9, 2015, pp. 368-371.

(Continued)

*Primary Examiner* — Nguyen Tran
(74) *Attorney, Agent, or Firm* — Saile Ackerman LLC; Stephen B. Ackerman

(57) ABSTRACT

A power converter is presented. The power converter may be configured to receive an input voltage at an input node of the power converter and to generate an output voltage at an output node of the power converter. The power converter may comprise an inductor coupled between an inductor node and the output node. The power converter may comprise a flying capacitor coupled between a first capacitor node and a second capacitor node. The power converter may comprise a first switching element coupled between the input node and the first capacitor node. The power converter may comprise a second switching element coupled between the second capacitor node and the inductor node. The power converter may be configured to, during a first phase of a buck operation mode, open the second switching element such that the second capacitor node is isolated from the inductor node.

18 Claims, 25 Drawing Sheets

(56) References Cited

U.S. PATENT DOCUMENTS

| | | |
|---|---|---|
| 2013/0176076 A1 | 7/2013 | Riehl |
| 2014/0070787 A1 | 3/2014 | Arno |
| 2020/0228003 A1 | 7/2020 | Baek et al. |
| 2020/0295655 A1* | 9/2020 | Takahiro ................. H02M 3/07 |
| 2021/0036604 A1* | 2/2021 | Khlat ....................... H03F 3/19 |

OTHER PUBLICATIONS

German Office Action, File No. 10 2021 202 137.9, Applicant: Dialog Semiconductor (UK) Limited, dated Sep. 15, 2021, 9 pages.

* cited by examiner

HYBRID BUCK-BOOST POWER CONVERTER

TECHNICAL FIELD

The present document relates to power converters. In particular, the present document relates to improved hybrid buck-boost power converters which may be implemented using transistors with low voltage ratings (i.e. with a low maximum drain-source voltage) and without body switching capabilities.

BACKGROUND

There is an increasing demand for high-efficiency, regulated power converters in several market segments such as e.g. solid-state drives (SSDs), computing devices, charging devices, or wearable power management integrated circuits (PMICs). Specifically, it is highly desirable to design power converters with higher efficiency and smaller area.

The present document concerns "hybrid" buck-boost power converters, i.e. power converters comprising both flying capacitors and inductors. Buck-boost power converters typically comprise a plurality of the switching elements for controlling current paths within the power converter. Depending on the application scenario, the regulated output voltage may be higher than, lower than, or equal to the input voltage of the power converter. To this end, the switching behavior of the switching elements is adapted such that the power converter operates in buck mode, in boost mode, or in buck-boost mode.

Each switching element is characterized by a voltage rating, i.e. a maximum voltage the switching element can withstand without being damaged. If field effect transistors (FETs) are used as switching elements, the voltage rating may correspond to the maximum voltage that may be applied across the non-conducting drain-source channel of a FET. Using FETs with reduced voltage rating makes it possible to reduce the area of the switching elements for a given target resistance, $R_{ON}$. Moreover, FETs with lower voltage rating typically have a smaller specific resistance and a smaller gate capacitance. It is therefore desirable to design a new hybrid power converter which allows the usage of FETs with low voltage ratings.

SUMMARY

The present document addresses the above-mentioned technical problems. In particular, the present document addresses the technical problem of providing a novel hybrid buck-boost power converter which may be implemented with FETs with a reduced voltage rating and/or size.

According to an aspect, a power converter is presented. The power converter may be configured to receive an input voltage at an input node of the power converter and to generate an output voltage at an output node of the power converter. The power converter may comprise an inductor coupled between an inductor node and the output node. The power converter may comprise a flying capacitor coupled between a first capacitor node and a second capacitor node. The power converter may comprise a first switching element coupled between the input node and the first capacitor node. The power converter may comprise a second switching element coupled between the second capacitor node and the inductor node.

As will be explained in more detail in the below description, coupling the second switching element between the capacitor and the inductor may reduce a voltage across the first switching element and, as a consequence, may allow the usage of a device with a lower voltage rating for implementing the first switching element.

The flying capacitor may be a passive electronic component capable of storing electrical energy in an electric field. The flying capacitor may comprise a first terminal and a second terminal. The flying capacitor is denoted as "flying" since, during different operation modes of the described power converter, one of said terminals may be a fixed terminal which is driven to a defined voltage level and the voltage at the other terminal may fly to a voltage that depends on the voltage at the fixed terminal and the voltage across the flying capacitor. The voltage across the flying capacitor may in turn depend on the amount of charge stored and on the capacitance of the flying capacitor. The terminals of the flying capacitor may not be connected to a reference potential such as e.g. ground.

The power converter may be configured to, during a first phase of a buck operation mode, open the second switching element such that the second capacitor node is isolated from the inductor node.

During the first phase of the buck operation mode, a voltage at the inductor node may be drawn to a reference voltage such as e.g. ground. The flying capacitor, which may be typically pre-charged to the input voltage during a preceding phase, may now force a voltage at the first capacitor node to a negative voltage, if the second switching element is absent, i.e. if the second capacitor node is directly coupled to the inductor node. Such a negative voltage at the first capacitor node may increase a voltage across the first switching element, which is then coupled between said negative voltage and the input voltage at the input node. With the help of the second switching element which may be open during the first phase of the buck operation mode, the second capacitor node may be effectively decoupled from the inductor node, the voltage at the second capacitor node may not be drawn to the reference potential, and the voltage at the first capacitor node may not get negative. Thus, a transistor with a lower voltage rating may be used for implementing the first switching element.

The power converter may further comprise a third switching element coupled between the input node and the second capacitor node. The power converter may further comprise a fourth switching element coupled between the first capacitor node and a reference potential.

Throughout this document, the term "reference potential" is meant in its broadest possible sense. In particular, the reference potential is not limited to ground i.e. a reference potential with a direct physical connection to earth or a voltage of 0V. Rather, the term "reference potential" may refer to any reference point to which and from which electrical currents may flow or from which voltages may be measured. Moreover, it should be mentioned that the reference potentials mentioned in this document may not necessarily refer to the same physical contact. Instead, the reference potentials mentioned in this document may relate to different physical contacts although reference is made to "the" reference potential for ease of presentation.

The power converter may further comprise a fifth switching element coupled between the inductor node and the reference potential. For example, the reference potential may be directly connected to the fifth switching element such that one terminal of the fifth switching element is directly connected to the reference potential and the other terminal of the fifth switching element is directly connected to the inductor node.

The first, second, third, fourth, and fifth switching element may be implemented with any suitable devices, such as, for example, metal-oxide-semiconductor field effect transistors (MOSFETs), insulated-gate bipolar transistors (IGBTs), MOS-gated thyristors, or other suitable power devices. The switching elements may be implemented using identical transistors or different transistors. For example, the first switching element may be a p-type MOSFET, and the other switching elements (i.e. the second, third, fourth, and fifth switching element) may be implemented using n-type MOSFETs. Each switching element may have a control terminal (e.g. a gate) to which a respective control signal or driving voltage may be applied to turn the switching element on (i.e. to close the switching element) or to turn the switching element off (i.e. to open the switching element).

In general, the power converter may be configured to operate in one of at least three different operation modes: a buck operation mode, a boost operation mode, or a buck-boost operation mode. In the buck operation mode, the regulated output voltage may be lower than the input voltage, and the output current may be higher than the input current. In the boost operation mode, the regulated output voltage may be higher than the input voltage, and the output current may be lower than the input current. Finally, in the buck-boost operation mode, the regulated output voltage may be higher or lower than the input voltage. The regulated output voltage may also be equal to the input voltage.

In the buck operation mode, the power converter may be configured to alternately switch—with an adjustable duty cycle—between a first phase and a second phase.

The power converter may be configured to, during the first phase of the buck operation mode, establish a current path from a reference potential via the inductor to the output node, and a current path from the input node via the flying capacitor to the reference potential. For example, the power converter may be configured to establish the former current path by closing the fifth switching element, and to establish the latter current path by closing the third and the fourth switching element.

The power converter may be configured to, during a second phase of the buck operation mode, establish a current path from the input node via the inductor to the output node, and a current path from the input node via the flying capacitor to a reference potential. For example, the power converter may be configured to establish the former current path by closing the second and the third switching element, and to establish the latter current path by closing the third and the fourth switching element.

In the boost operation mode, the power converter may be configured to alternately switch—with an adjustable duty cycle—between a first phase and a second phase.

The power converter may be configured to, during a first phase of a boost operation mode, establish a current path from the input node via the flying capacitor and via the inductor to the output node. For example, the power converter may be configured to establish the current path in the first phase of the boost operation mode by closing the first and the second switching element.

The power converter may be configured to, during a second phase of the boost operation mode, establish a current path from the input node via the inductor to the output node, and a current path from the input node via the flying capacitor to a reference potential. For example, the power converter may be configured to establish the former current path by closing the second and the third switching element, and to establish the latter current path by closing the third and the fourth switching element. The current paths and the switching behavior of the power converter in the second phase of the boost operation mode and the second phase of the buck operation mode may be identical.

Finally, in the buck-boost operation mode, the power converter may be configured to alternately switch—with adjustable duty cycles—between a first, a second, and a third phase.

The power converter may be configured to, during a first phase of a buck-boost operation mode, establish a current path from the input node via the flying capacitor and via the inductor to the output node. For example, the power converter may be configured to establish this current path by closing the first and the second switching element. Thus, the first phase of the buck-boost operation mode may correspond to the first phase of the boost operation mode.

The power converter may be configured to, during a second phase of the buck-boost operation mode, establish a current path from the input node via the inductor to the output node, and a current path from the input node via the flying capacitor to a reference potential. For example, the power converter may be configured to establish the former current path by closing the second and the third switching element, and to establish the latter current path by closing the third and the fourth switching element. Hence, the second phase of the buck-boost operation mode may correspond to the second phase of the boost operation mode.

The power converter may be configured to, during a third phase of the buck-boost operation mode, establish a current path from a reference potential via the inductor to the output node, and a current path from the input node via the flying capacitor to the reference potential. For example, the power converter may be configured to establish the former current path by closing the fifth switching element, and to establish the latter current path by closing the third and the fourth switching element. Again, the power converter may be configured to, during the third phase of the buck-boost operation mode, open the second switching element such that the second capacitor node is isolated from the inductor node.

As mentioned in the forgoing description, the reference potential may be directly connected to the fifth switching element. As an alternative, the fifth switching element may be indirectly coupled to the reference potential via the fourth switching element. In other words, the fifth switching element may be coupled between the inductor node and the first capacitor node. In yet other words, the fourth switching element and the fifth switching element may form a series connection between the inductor node and the reference potential. As a technical advantage, during operation of the power converter, a maximum voltage across the fifth switching element may be reduced, and a transistor with a lower voltage rating may be used for implementing the fifth switching element.

The power converter may be configured to, during an alternative first phase of the buck operation mode, establish a current path from a reference potential via the inductor to the output node by closing the fourth and the fifth switching elements, and establish a current path from the input node via the flying capacitor to the reference potential by closing the third switching element. This alternative first phase of the buck operation mode may replace the above-described first phase of the buck operation mode. During an alternative buck operation mode, the power converter may then be configured to alternately switch between the alternative first phase of the buck operation mode and the above-described second phase of the buck operation mode.

Similarly, the power converter may be configured to, during an alternative third phase of the buck-boost operation mode, establish a current path from a reference potential via the inductor to the output node by closing the fourth and the fifth switching elements, and establish a current path from the input node via the flying capacitor to the reference potential by closing the third switching element.

This alternative third phase of the buck-boost operation mode may replace the above-described third phase of the buck-boost operation mode. During an alternative buck-boost operation mode, the power converter may then be configured to alternately switch between the alternative third phase of the buck-boost operation mode, the above-described first phase of the buck-boost operation mode, and the above-described second phase of the buck-boost operation mode.

The power converter may be configured to use the second switching element for sensing a current through the inductor. Alternatively, or additionally, the current through the inductor may be sensed/measured using an additional circuit element at the drain terminal of the second switching element or at the source terminal of the second switching element. For example, the current through the inductor may be sensed by mirroring the current flowing through the second switching element. This current (which may be much smaller than the original one flowing in the second switching element) may than be converted into a voltage or may be used directly in a control loop of the power converter.

As illustrated in FIG. 14, the power converter may further comprise a second flying capacitor coupled between the inductor node VLX_NEG and an intermediate node VLX_POS. The second switching element may be coupled between the second capacitor node VCY_1 and the intermediate node VLX_POS. The fifth switching element may be coupled between the intermediate node and the reference potential. Alternatively, as described in the foregoing description, and as illustrated in FIG. 15, the fifth switching element may be coupled between the intermediate node VLX_POS and the first capacitor node VCX_1. The power converter may further comprise a sixth switching element coupled between the inductor node VLX_NEG and the reference potential.

According to another aspect, a method of operating a power converter is presented. The method may comprise steps which correspond to the functional features of the hybrid power converter described in the present document. In particular, the power converter may comprise an inductor coupled between an inductor node and an output node of the power converter, and a flying capacitor coupled between a first capacitor node and a second capacitor node. The method may comprise establishing, during a first phase of a buck operation mode or a buck-boost operation mode, a current path from a reference potential, via the inductor node, via the inductor to the output of the power converter. The method may comprise isolating, during said first phase of the buck operation mode or the buck-boost operation mode, the inductor node from the second capacitor node.

The method may comprise coupling a first switching element between the input node and the first capacitor node. The step of isolating the inductor node from the second capacitor node may comprise opening a second switching element which is coupled between the inductor node and the second capacitor node.

The method may comprise coupling a third switching element between the input node and the second capacitor node. The method may comprise coupling a fourth switching element between the first capacitor node and a reference potential. The method may comprise coupling a fifth switching element between the inductor node and the reference potential.

The method may comprise establishing, during the first phase of the buck operation mode, a current path from a reference potential via the inductor to the output node, and a current path from the input node via the flying capacitor to the reference potential. The method may comprise establishing, during a second phase of the buck operation mode, a current path from the input node via the inductor to the output node, and a current path from the input node via the flying capacitor to a reference potential.

The method may comprise establishing, during a first phase of a boost operation mode, a current path from the input node via the flying capacitor and via the inductor to the output node. The method may comprise establishing, during a second phase of the boost operation mode, a current path from the input node via the inductor to the output node, and a current path from the input node via the flying capacitor to a reference potential.

The method may comprise establishing, during a first phase of a buck-boost operation mode, a current path from the input node via the flying capacitor and via the inductor to the output node. The method may comprise establishing, during a second phase of the buck-boost operation mode, a current path from the input node via the inductor to the output node, and a current path from the input node via the flying capacitor to a reference potential. The method may comprise establishing, during a third phase of the buck-boost operation mode, a current path from a reference potential via the inductor to the output node, and a current path from the input node via the flying capacitor to the reference potential.

The method may comprise coupling the fifth switching element between the inductor node and the first capacitor node. The method may comprise establishing, during an alternative first phase of the buck operation mode, a current path from a reference potential via the inductor to the output node by closing the fourth and the fifth switching elements and establishing a current path from the input node via the flying capacitor to the reference potential by closing the third switching element.

The method may comprise sensing a current through the inductor by using the second switching element.

It should be noted that the methods and systems including its preferred embodiments as outlined in the present document may be used stand-alone or in combination with the other methods and systems disclosed in this document. In addition, the features outlined in the context of a system are also applicable to a corresponding method. Furthermore, all aspects of the methods and systems outlined in the present document may be arbitrarily combined. In particular, the features of the claims may be combined with one another in an arbitrary manner.

In the present document, the term "couple" or "coupled" refers to elements being in electrical communication with each other, whether directly connected e.g., via wires, or in some other manner.

BRIEF DESCRIPTION OF THE DRAWINGS

The present invention is illustrated by way of example, and not by way of limitation, in the figures of the accompanying drawings in which like reference numerals refer to similar or identical elements, and in which.

DETAILED DESCRIPTION

Figure 1:
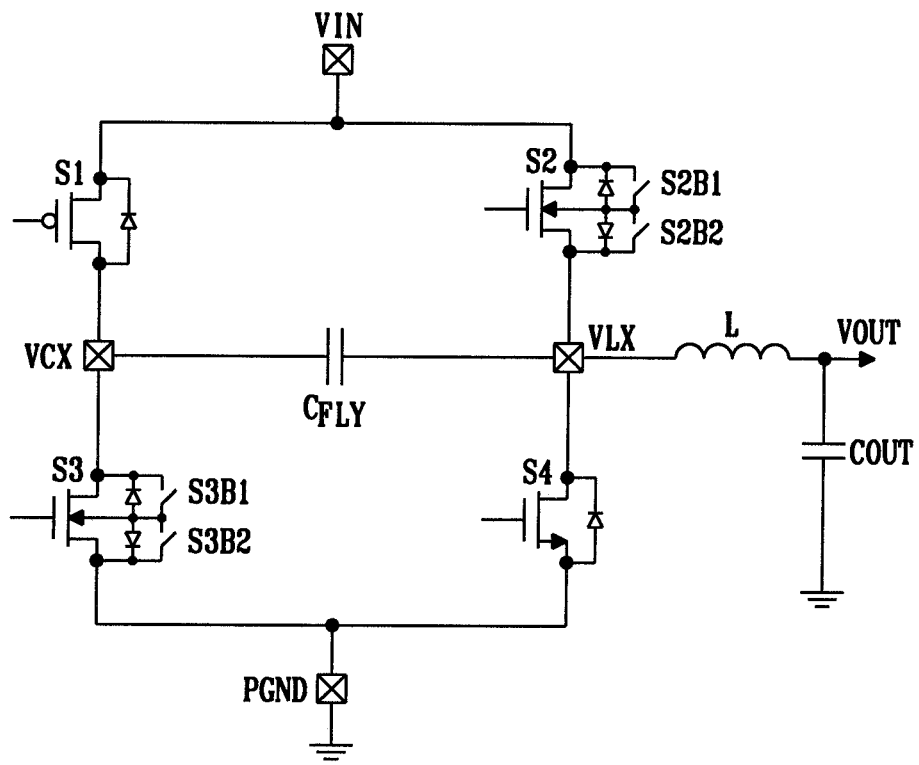
FIG. 1 shows an exemplary hybrid buck-boost power converter.

FIG. 1 shows an exemplary hybrid buck-boost power converter. In theory, the depicted power converter may generate an output voltage $V_{OUT}$ up to $2V_{IN}$, i.e. two times the input voltage $V_{IN}$. In mobile applications, the input voltage $V_{IN}$ is typically generated by a single cell Li-Ion battery. The power converter comprises four transistors S1 to S4, a flying capacitor $C_{FLY}$, an inductor L, and an output capacitor COUT.

Figure 2:
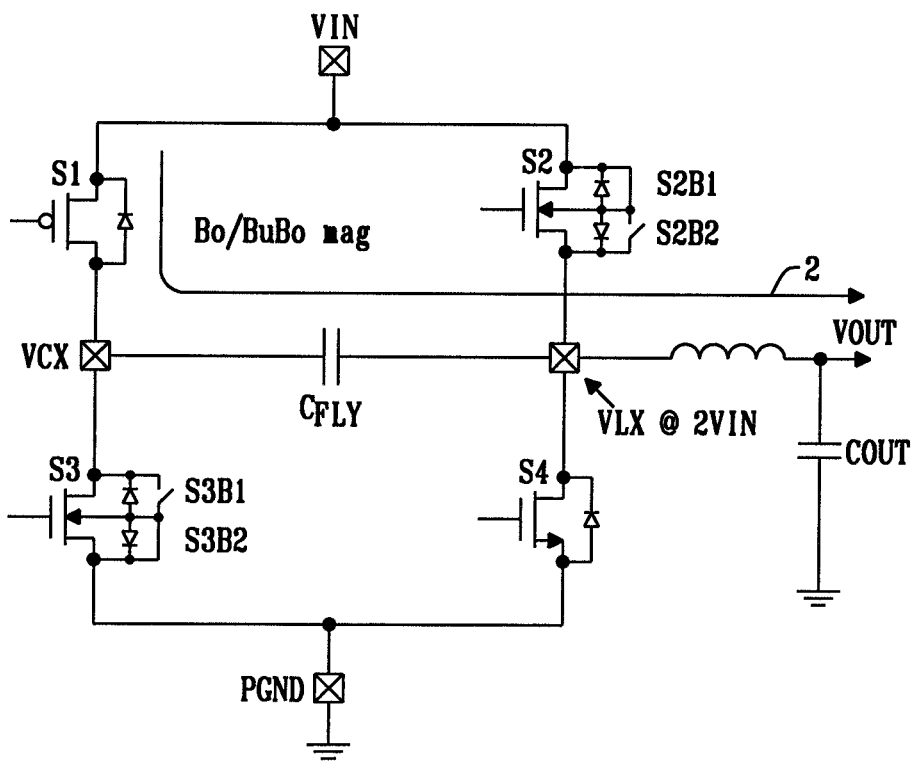
FIG. 2 shows a switching phase for a boost or buck-boost operation mode for the power converter of FIG. 1.
Figure 3:
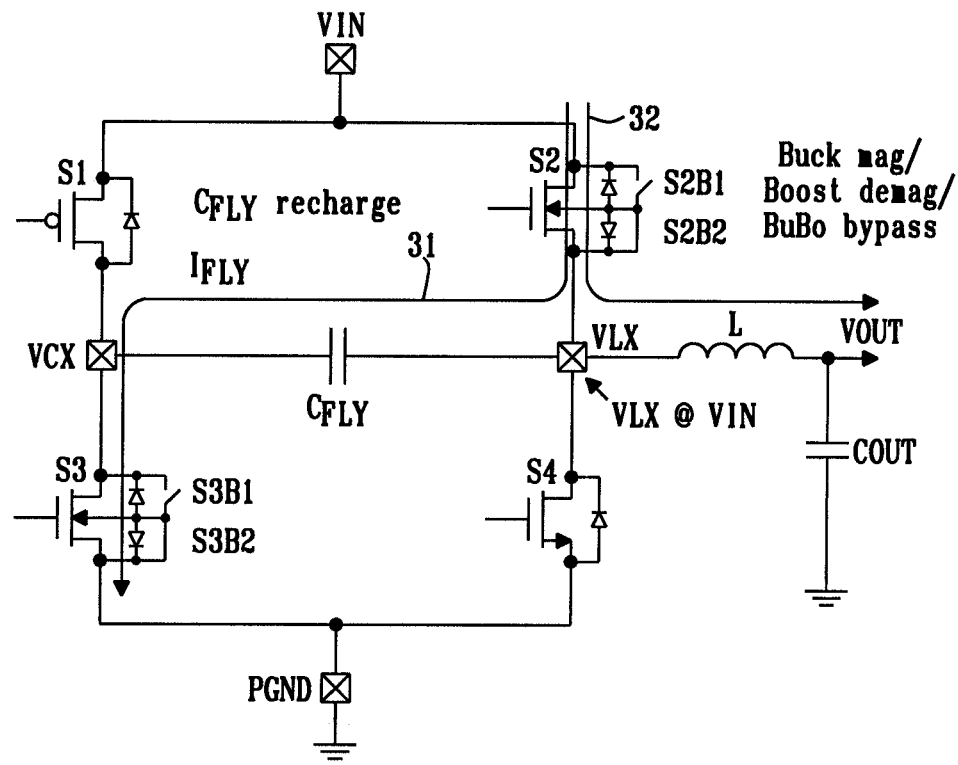
FIG. 3 shows a switching phase for a buck, boost or buck-boost operation mode for the power converter of FIG. 1.
Figure 4:
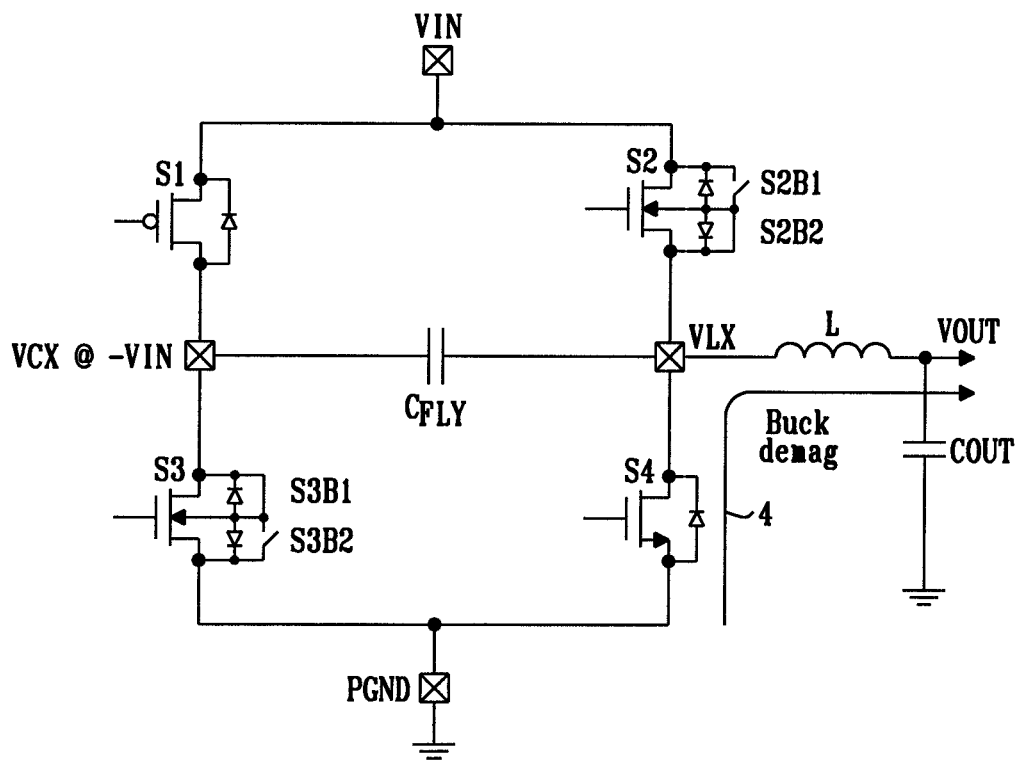
FIG. 4 shows a switching phase for a buck operation mode for the power converter of FIG. 1.

FIGS. 2, 3, and 4 show the different switching phases of the exemplary hybrid buck-boost power converter of FIG. 1. In the buck operation mode, the power converter cycles through the phases of FIG. 3 and FIG. 4. It is equivalent to a conventional buck power converter involving switches S2 and S4. During the buck demagnetizing phase illustrated in FIG. 4, a current 4 flows from reference potential PGND to the output VOUT. During the buck magnetizing phase illustrated in FIG. 3, a current 31 flows from the input VIN via switch S2, via the flying capacitor, and via switch S3 to reference potential PGND. Another current 32 flows from the input VIN via switch S2 and via the inductor to the output VOUT. The relationship between VIN and VOUT is expressed by VOUT/VIN=D, wherein D denotes a duty cycle between 0 and 1.

In the boost operation mode, the power converter cycles through phases of FIG. 2 and FIG. 3. It involves only switches S1, S2 and S3. During the boost magnetizing phase illustrated in FIG. 2, a current 2 flows from the input VIN via switch S1, via the flying capacitor, and via the inductor to the output VOUT. During the boost demagnetizing phase illustrated in FIG. 3, a current 31 flows from the input VIN via switch S2, via the flying capacitor, and via switch S3 to reference potential PGND for charging the flying capacitor. Another current 32 flows from the input VIN via switch S2 and via the inductor to the output VOUT. The relationship between VIN and VOUT becomes VOUT/VIN=1+D, wherein D denotes a duty cycle between 0 and 1.

The buck-boost operation cycles through phases of FIGS. 2, 3, and 4. This operation involves all switches. In particular, a magnetizing phase during which the inductor is magnetized is illustrated in FIG. 2, a buck-boost bypass phase is illustrated in FIG. 3, and a buck demagnetizing phase is illustrated in FIG. 4.

It should be noted that switches S2 and S3 may require bulk switches (or back-to-back switches) in order to guarantee the correct operation. During the buck demagnetizing phase (FIG. 4) the voltage of node VCX goes below the reference voltage PGND to −VIN and therefore the switch S3B1 should be closed. During the boost magnetizing phase (FIG. 2) the voltage of node VLX goes above the input voltage VIN to 2VIN and S2B1 should be closed.

The voltage rating (i.e. the maximum drain-source voltage $V_{DS}$ voltage $V_{DS\_max}$) for the FET devices in the power converter of FIG. 1 is summarized in the table below:

| Switch | $V_{DS\_max}$ |
|---|---|
| S1 | $2V_{IN}$ |
| S2 | $V_{IN}$ |
| S3 | $V_{IN}$ |
| S4 | $2V_{IN}$ |

A higher voltage rating translates into a higher specific resistance $R_{SP}$ for the device and, in turn, into a larger silicon area for a given target resistance $R_{ON}$ of a FET device.

Figure 5:
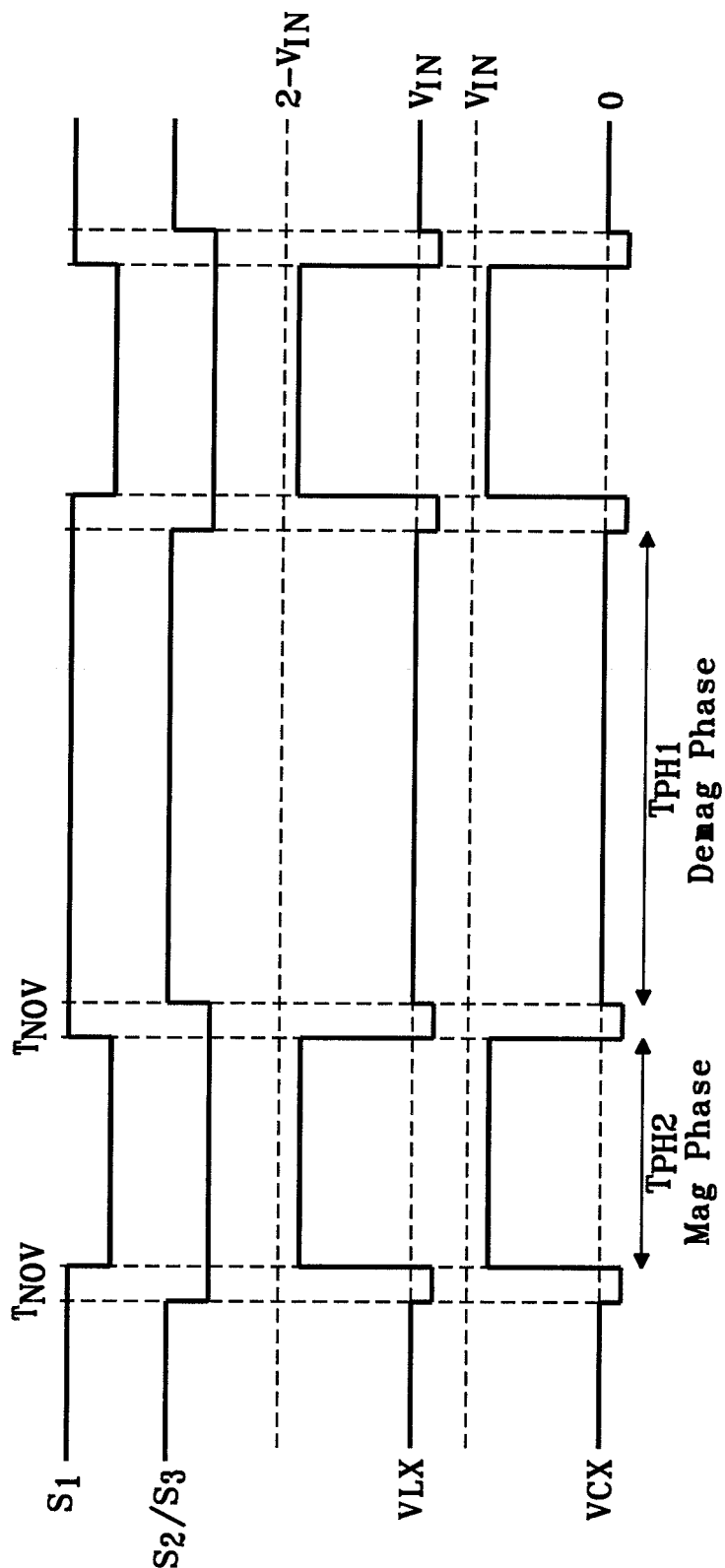
FIG. 5 shows a timing diagram of the power converter in FIG. 1 when operating in boost mode.

The power converter of FIG. 1 may have an output voltage $V_{OUT}$ limitation during its boost operation. The timing diagram of the power converter during boost operation is shown in FIG. 5.

The limitation is a consequence of the charge conservation on the flying capacitor $C_{FLY}$: the charge removed from the capacitor during the boost magnetizing phase (FIG. 2) is added during the boost demagnetizing phase (FIG. 3). Therefore, the capacitor current $I_{FLY}$ flowing in the capacitor $C_{FLY}$ during the demagnetizing phase can be expressed as (by applying charge conservation principle): $I_{FLY}/I_{OUT}=D/(1-D)$, wherein D denotes a duty cycle between 0 and 1. The latter equation indicates that in order to keep $I_{FLY}<I_{OUT}$, the duty cycle D should be limited to 0.5. For values of D>0.5, the capacitor current $I_{FLY}$ may experience a steep increase.

Figure 6:
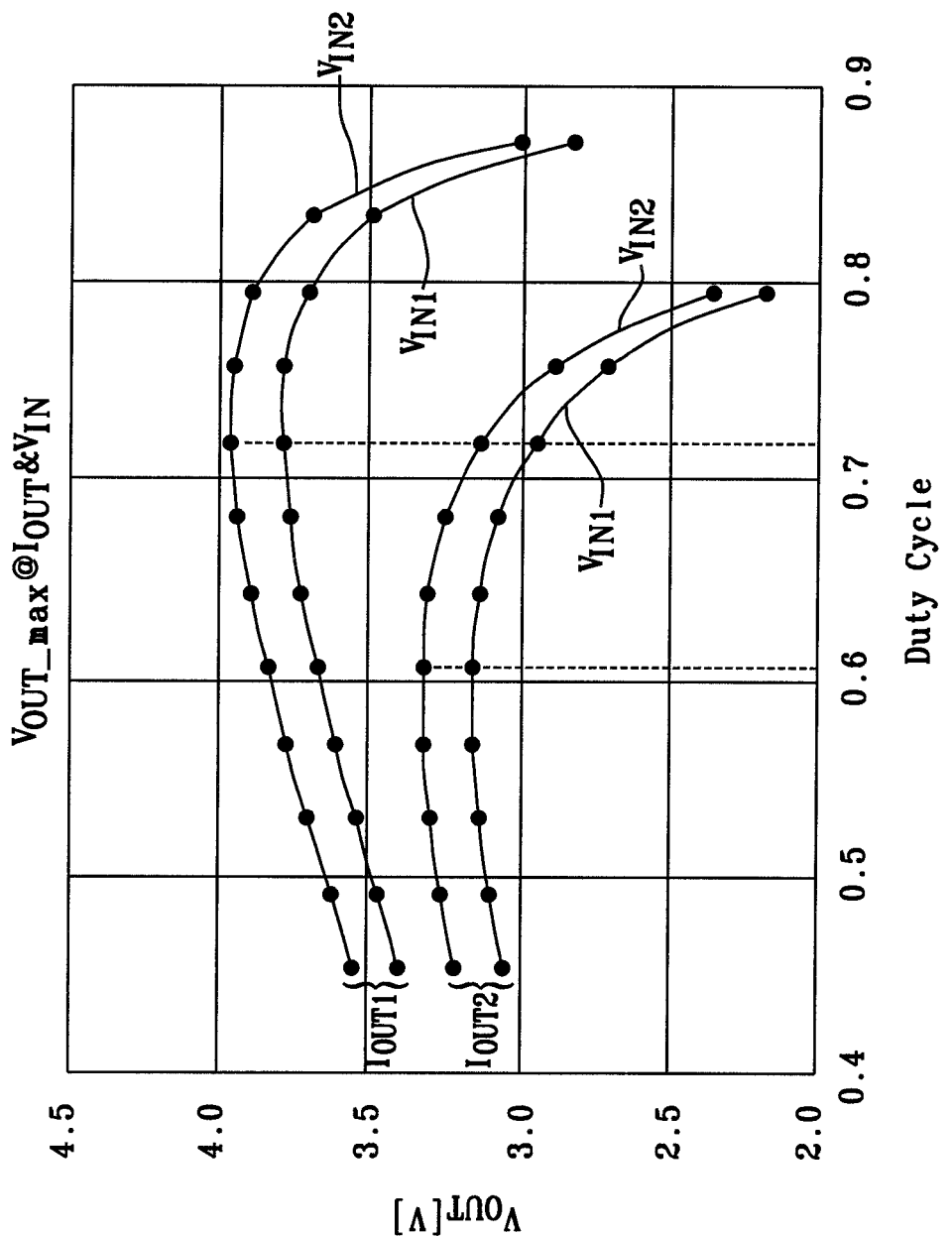
FIG. 6 shows simulation results for the power converter in FIG. 1.

FIG. 6 shows simulation results for the power converter in FIG. 1. In particular, the simulation results illustrate the trade-off between the maximum output voltage $V_{OUT\_max}$ and the output current $I_{OUT}$ for the converter in FIG. 1 in boost mode. FIG. 6 shows the maximum output voltage $V_{OUT}$ achievable for different values of the output load $I_{OUT}$ for input voltages $V_{IN1}$ and $V_{IN2}$, wherein $V_{IN2}-V_{IN1}=100$ mV. In FIG. 6, the output currents are denoted as $I_{OUT1}$ and $I_{OUT2}$, wherein $I_{OUT2}-I_{OUT1}=1.5$ A. Because of the increase of the capacitor current $I_{FLY}$ for increasing duty cycle values, the voltage across the flying capacitor $C_{FLY}$ is progressively reduced by the IR drop on the ON-resistance $R_{ON}$ of switches S2 and S3 and on the equivalent series resistance ESR of the flying capacitor $C_{FLY}$. Therefore, the output voltage reaches a maximum value $V_{OUT\_max}$ at a given duty cycle value (>0.5) beyond which the output voltage drops abruptly.

Figure 7:
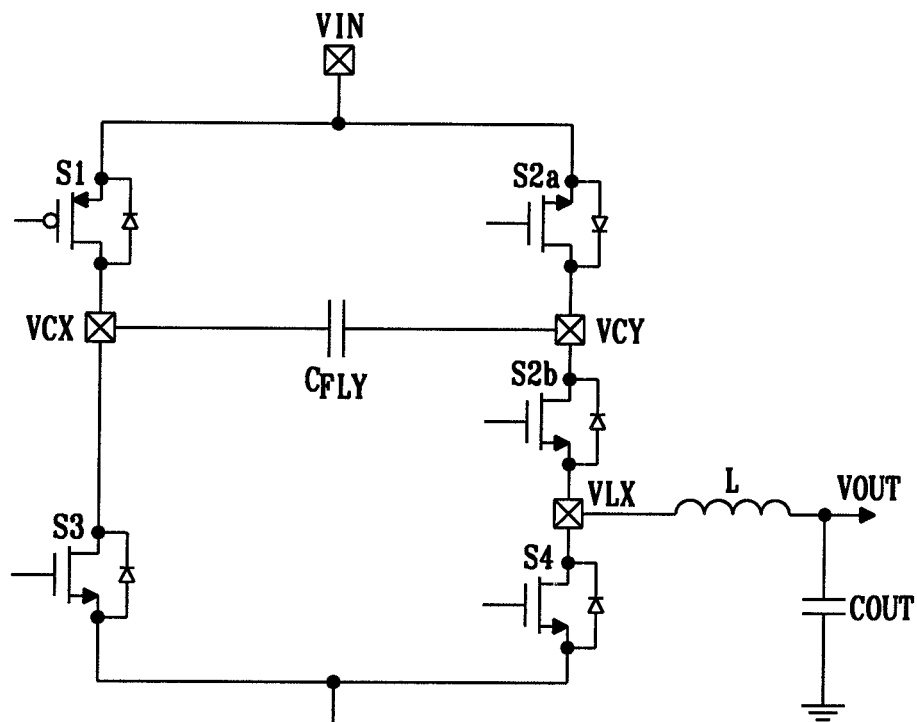
FIG. 7 shows another exemplary hybrid buck-boost power converter.

FIG. 7 shows another exemplary hybrid buck-boost power converter. The power converter comprises five transistors S1, S2a, S2b, S3 and S4, a flying capacitor $C_{FLY}$, an inductor L, and an output capacitor COUT. Transistor S1 corresponds to the first switching element in the claims, transistor S2b corresponds to the second switching element in the claims, transistor S2a corresponds to the third switching element in the claims, transistor S3 corresponds to the fourth switching element in the claims, and transistor S4 corresponds to the fifth switching element in the claims. The inductor L is coupled between the inductor node VLX and the output node VOUT, and the flying capacitor $C_{FLY}$ is coupled between a first capacitor node VCX and a second capacitor node VCY.

Figure 8:
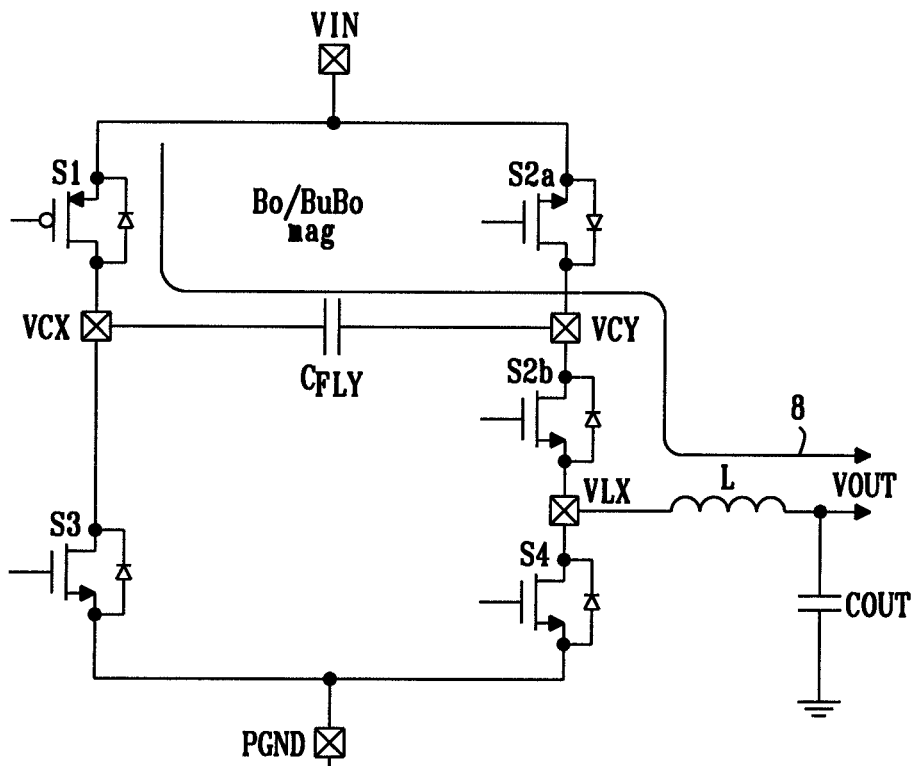
FIG. 8 shows a switching phase for a boost or buck-boost operation mode for the power converter of FIG. 7.
Figure 9:
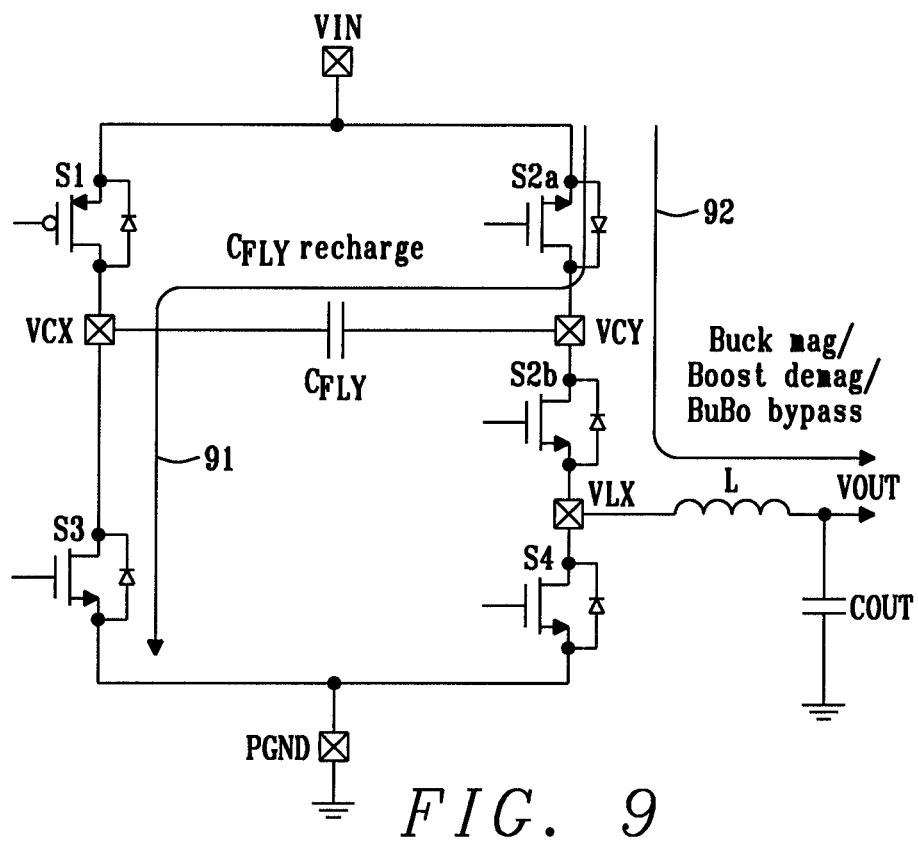
FIG. 9 shows a switching phase for a buck, boost or buck-boost operation mode for the power converter of FIG. 7.
Figure 10:
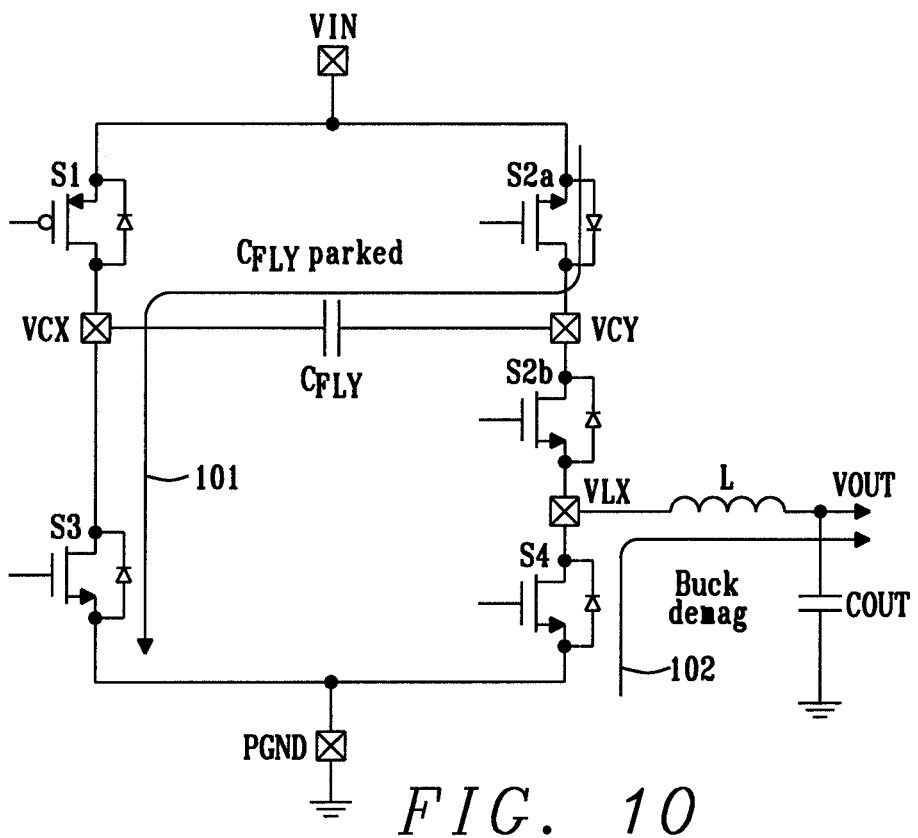
FIG. 10 shows a switching phase for a buck operation mode for the power converter of FIG. 7.

The switching behavior of the circuit in FIG. 7 is depicted in FIGS. 8 to 10 and is similar to the switching behavior of the circuit in FIG. 1. The repetition of similar a description is therefore omitted and the reader is kindly referred to the forgoing description relating to the circuit in FIG. 1, and in particular to the switching phases described in the context of FIGS. 2, 3, and 4.

In the buck operation mode, the power converter cycles through the phases of FIG. 9 and FIG. 10. It is equivalent to a conventional buck involving switches S2b and S4. Switches S2a and S3 may be closed so that the flying capacitor $C_{FLY}$ is connected between the input voltage $V_{IN}$ and the reference potential PGND. During the buck demagnetizing phase illustrated in FIG. 10, a current 102 flows from reference potential PGND via switch S4 and the inductor to the output VOUT. Moreover, a further current 101 flows from the input Vin via switch S2a, via the flying capacitor, and via switch S3 to the reference potential PGND. During the buck magnetizing phase illustrated in FIG. 9, a current 91 flows from the input VIN via switches S2, via the flying capacitor, and via switch S3 to reference potential PGND. Another current 92 flows from the input VIN via switches S2a and S2b and via the inductor to the output VOUT.

In the boost operation mode, the power converter cycles through phases of FIG. 8 and FIG. 9. It involves switches S1, S2a, S2b and S3, wherein the boost magnetizing phase involves switches S1 and S2b, and wherein the boost demagnetizing phase involves switches S2a and S2b. The flying capacitor $C_{FLY}$ may also be recharged via switches S2a and S3. More specifically, during the boost magnetizing phase illustrated in FIG. 8, a current 8 flows from the input VIN via switch S1, via the flying capacitor, via switch S2b, and via the inductor to the output VOUT. During the boost demagnetizing phase illustrated in FIG. 9, a current 91 flows from the input VIN via switch S2a, via the flying capacitor, and via switch S3 to reference potential PGND for charging the flying capacitor. Another current 92 flows from the input VIN via switch S2a, via switch S2b, and via the inductor to the output VOUT.

The buck-boost operation cycles through phases of FIGS. 8, 9, and 10. This operation involves all switches. In particular, a magnetizing phase during which the inductor is magnetized is illustrated in FIG. 8, a buck-boost bypass phase is illustrated in FIG. 9, and a buck demagnetizing phase is illustrated in FIG. 10.

In comparison the power converter of FIG. 1, the power converter of FIG. 7 does not rely on body switching or back-to-back devices for implementing switches S2a, S2b, and S3. Further, the power converter of FIG. 7 uses lower voltage rated devices with the exception of switch S4.

Figure 11:
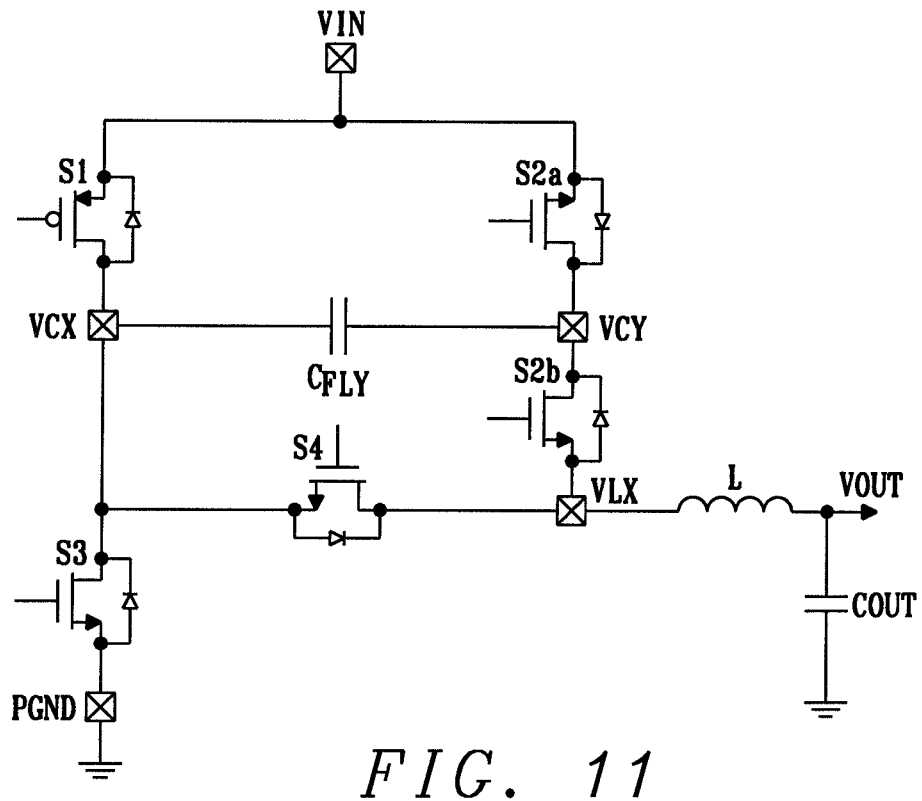
FIG. 11 shows another exemplary hybrid buck-boost power converter.

The topology of FIG. 7 can be further improved by modifying the connection of switch S3 as shown FIG. 11. This variant allows the use of low voltage rated devices for all switches. The table below shows the voltage ratings $V_{DS\_max}$ for the different hybrid power converter topologies presented in this document.

| | $V_{DS\_max}$ | |
|---|---|---|
| Switch | Power converter of FIG. 7 | Power converter of FIG. 11 |
| S1 | $V_{IN}$ | $V_{IN}$ |
| S2a | | |
| S2b | | |
| S3 | | |
| S4 | $2V_{IN}$ | |

The hybrid power converter of FIG. 11 operates as the hybrid power converter of FIG. 7 with the exception of the buck demagnetizing phase (shown in FIG. 10 for the power converter of FIG. 7) involving both switches S3 and S4.

Figure 12:
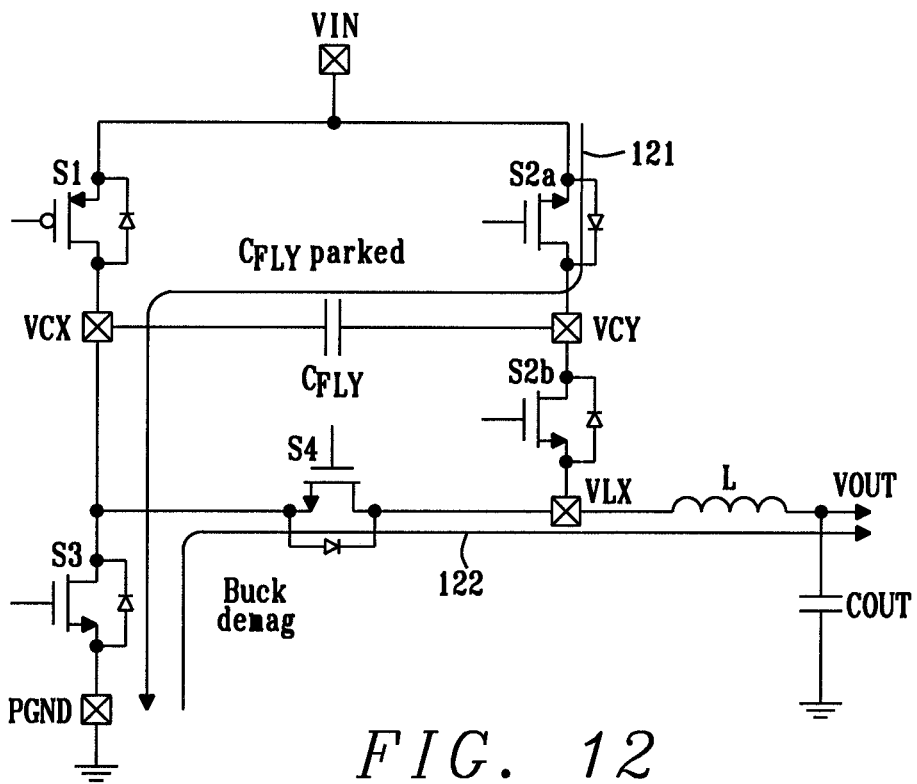
FIG. 12 shows a demagnetizing phase for the power converter of FIG. 11.

The corresponding demagnetizing phase for the power converter of FIG. 11 is depicted in FIG. 12. Due to the reduced voltage rating $V_{DS\_max}$ for the switches, devices with lower specific resistance $R_{SP}$ can be used to reduce the required silicon area while achieving a higher output voltage $V_{OUT}$ for a given output current $I_{OUT}$ and input voltage $V_{IN}$ or lower input voltage $V_{IN}$ for a given output voltage $V_{OUT}$ and output current $I_{OUT}$ It should be noted that, for the power converters of FIGS. 7 and 11, the recharge current $I_{FLY}$ flows through switches S2a and S3 when the flying capacitor $C_{FLY}$ is recharged. Therefore, switch S2b can be used for current sensing e.g. when peak current-mode control is used. This is in contrast with the architecture of FIG. 1 where both currents $I_{OUT}$ and $I_{FLY}$ flow through switch S2 during the boost magnetizing and buck magnetizing/buck-boost bypass phase (see FIG. 3).

The new hybrid buck-boost architecture of FIG. 7 and its variant of FIG. 11 have the same trade-off explained for the architecture out FIG. 1 between the maximum output voltage $V_{OUT\_max}$ and the output current $I_{OUT}$ because of the charge conservation on the flying capacitor $C_{FLY}$. However, the use of devices rated for lower $V_{DS}$ voltage allows reducing the IR drop developed on switches S2a and S3 while occupying less area on silicon.

Figure 13:
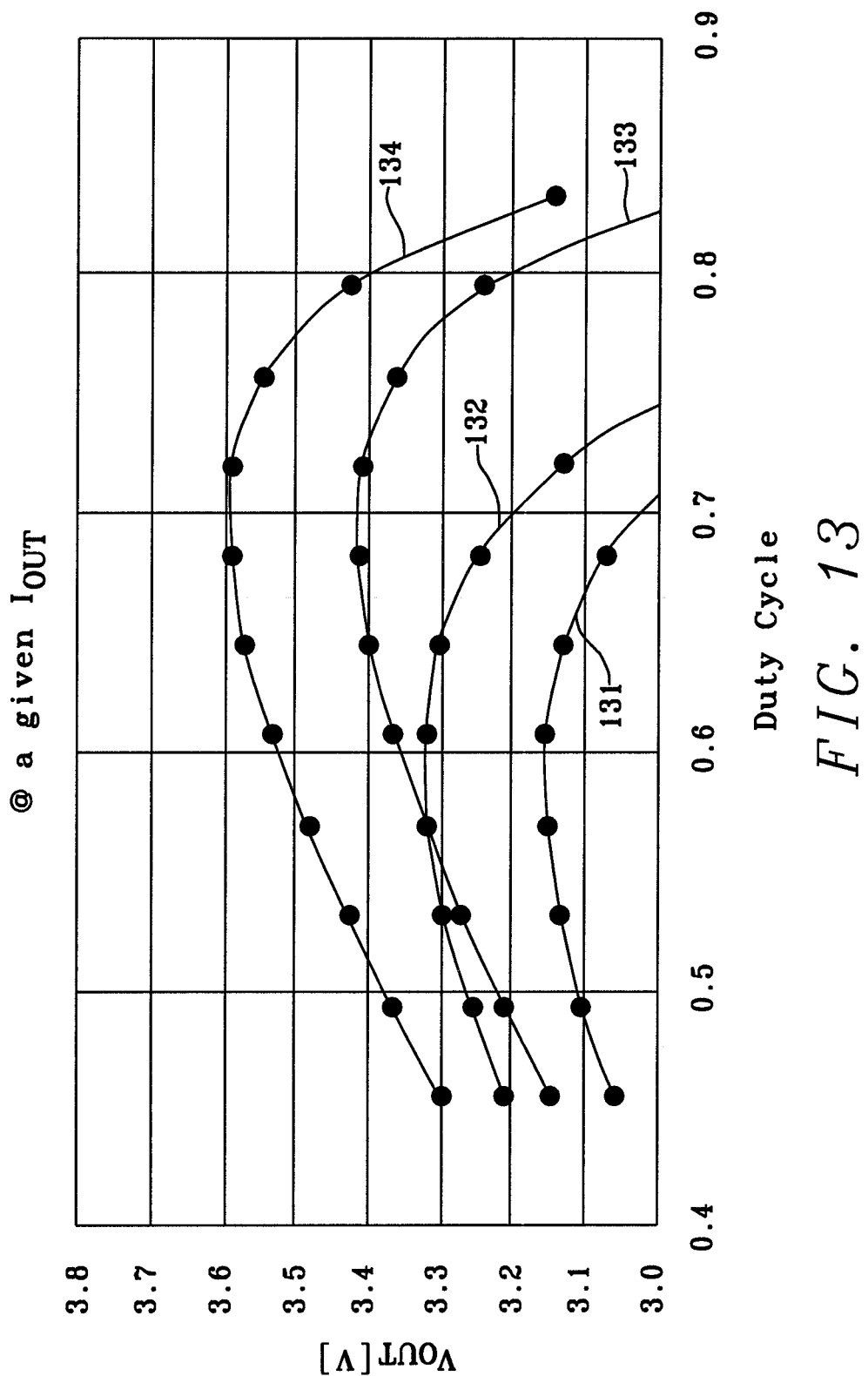
FIG. 13 shows simulation results for the power converter of FIG. 11.

Finally, FIG. 13 shows simulation results for the power converter of FIG. 11. FIG. 13 shows a comparison of the maximum output voltage $V_{OUT\_max}$ versus output current $I_{OUT}$ trade-off simulation between the architecture of FIG. 1 and the architecture of FIG. 11. In particular, FIG. 13 shows simulation results for input voltages $V_{IN1}$ and $V_{IN2}$, wherein $V_{IN2}-V_{IN1}=100$ mV, and for output currents $I_{OUT1}$ and $I_{OUT2}$, wherein $I_{OUT2}-I_{OUT1}=1.5$ A. More specifically, line 131 shows the output voltage $V_{OUT}$ over the duty cycle for the power converter of FIG. 1 and an input voltage $V_{IN1}$. Line 132 shows the output voltage $V_{OUT}$ over the duty cycle for the power converter of FIG. 1 and an input voltage $V_{IN2}$. Line 133 shows the output voltage $V_{OUT}$ over the duty cycle for the power converter of FIG. 11 and an input voltage $V_{IN1}$. Line 134 shows the output voltage $V_{OUT}$ over the duty cycle for the power converter of FIG. 11 and an input voltage $V_{IN2}$.

For an area which is reduced by approximately 40%, the architecture of FIG. 11 shows that for the same current load and same input voltage $V_{IN}$, the architecture of FIG. 11 reaches higher maximum output voltages $V_{OUT\_max}$.

In conclusion, the technical advantages of the presented power converters may be summarized as follows: The buck-boost converters in FIGS. 7 and 11 achieve the same functionality as the converter in FIG. 1 while allowing devices with lower voltage rating to be used. The power FETs do not require bulk-switching scheme or back-to-back devices. Instead, FETs with a fixed body connection may be used. Moreover, the use of devices with fixed body connection allows the use of FET with lower specific resistance $R_{SP}$ for the same voltage rating. As a result, for the same target impedance of the power FETs, the topologies of this invention occupy a lower area while achieving higher output voltages VOUT for a given load current. Alternatively, lower input voltages VIN could be achieved for the same output voltages VOUT and load currents IOUT.

As an additional advantage, peak current-mode control scheme is simpler to implement because it can rely on current sensing on switch S2b (see FIG. 7 or FIG. 11) where only the output current $I_{OUT}$ is flowing during the boost magnetizing (see FIG. 8) and the buck-boost bypass/buck magnetizing phases (see FIG. 9). In the power converter of FIG. 1, both the capacitor current $I_{FLY}$ and the output current $I_{OUT}$ are flowing through switch S2 during the buck-boost bypass/buck magnetizing phase (see FIG. 3).

Inverting Output Voltage Operation

Figure 14:
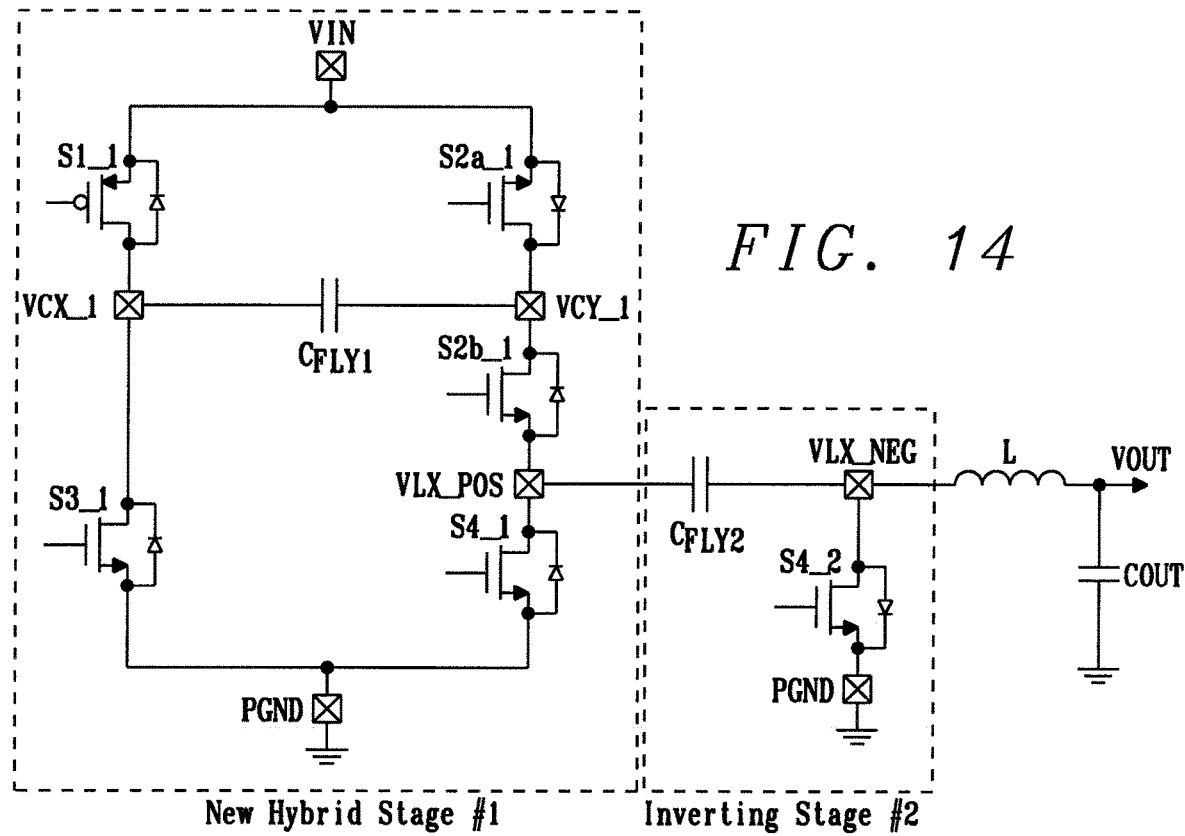
FIG. 14 shows a hybrid buck-boost converter cascaded with an inverting stage to generate an output voltage VOUT having opposite polarity w.r.t. input voltage VIN.
Figure 15:
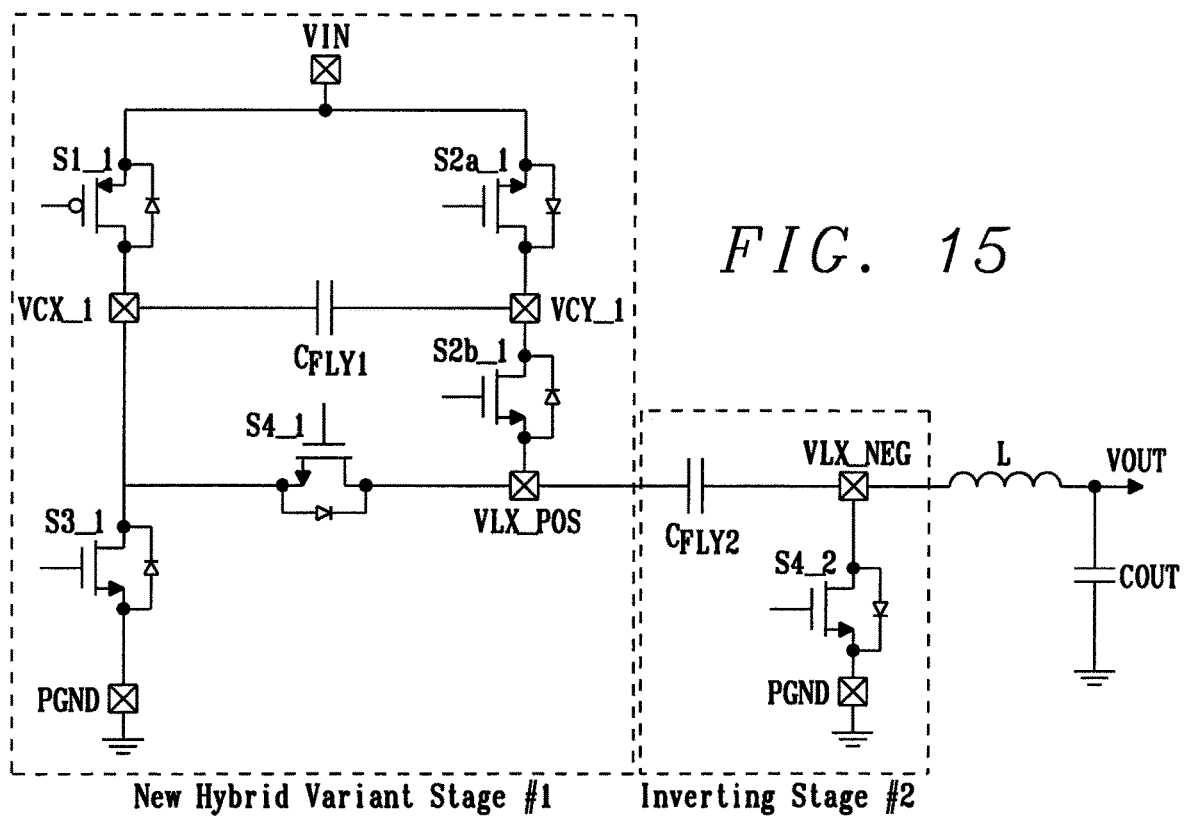
FIG. 15 shows new hybrid buck-boost variant cascaded with an inverting stage to generate an output voltage VOUT having opposite polarity w.r.t. input voltage VIN.
Figure 16:
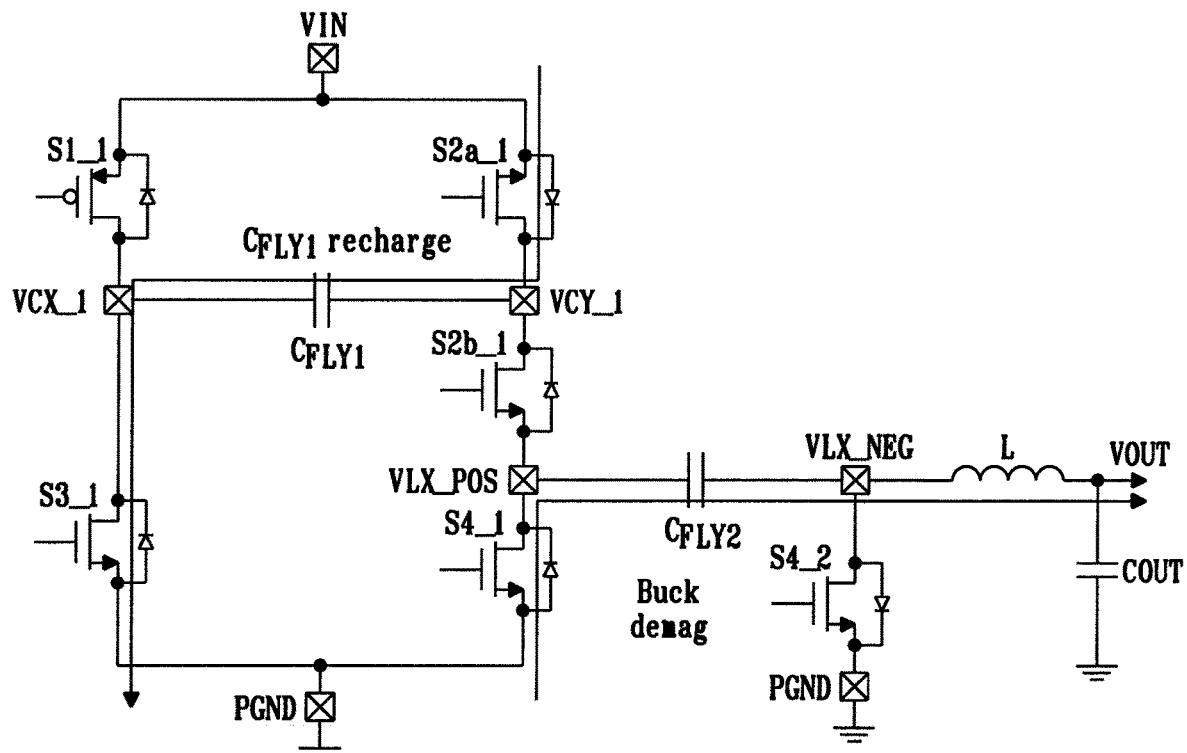
FIG. 16 shows an inverting buck boost demagnetizing phase.
Figure 17:
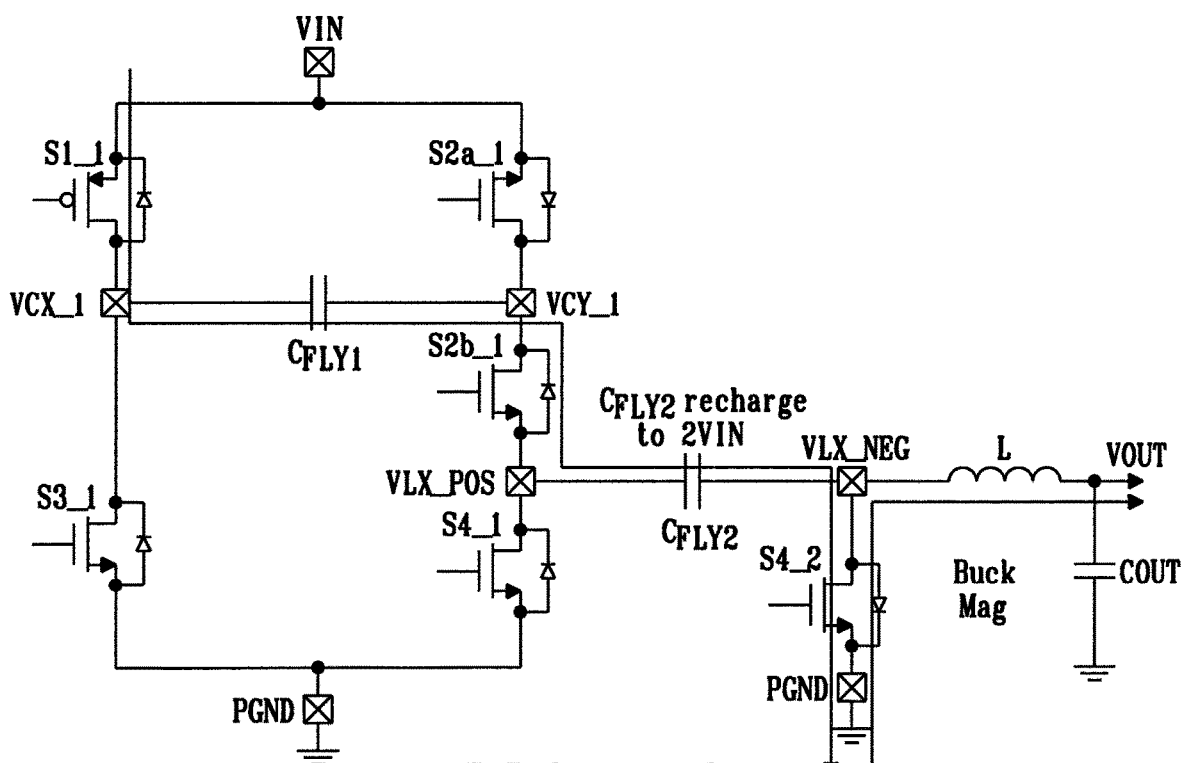
FIG. 17 shows inverting buck boost magnetizing phase with $C_{FLY2}$ recharged to $2V_{IN}$.
Figure 18:
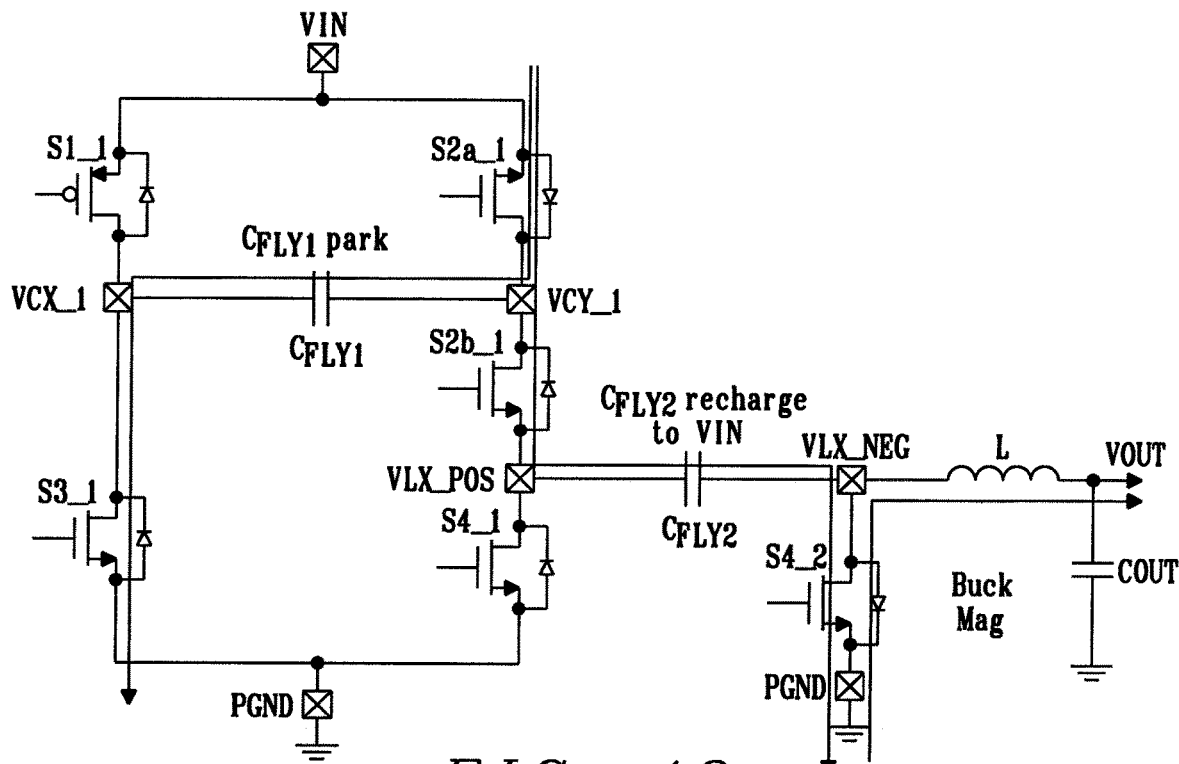
FIG. 18 shows an inverting buck boost magnetizing phase with $C_{FLY1}$ and $C_{FLY2}$ charged to $V_{IN}$.
Figure 19:
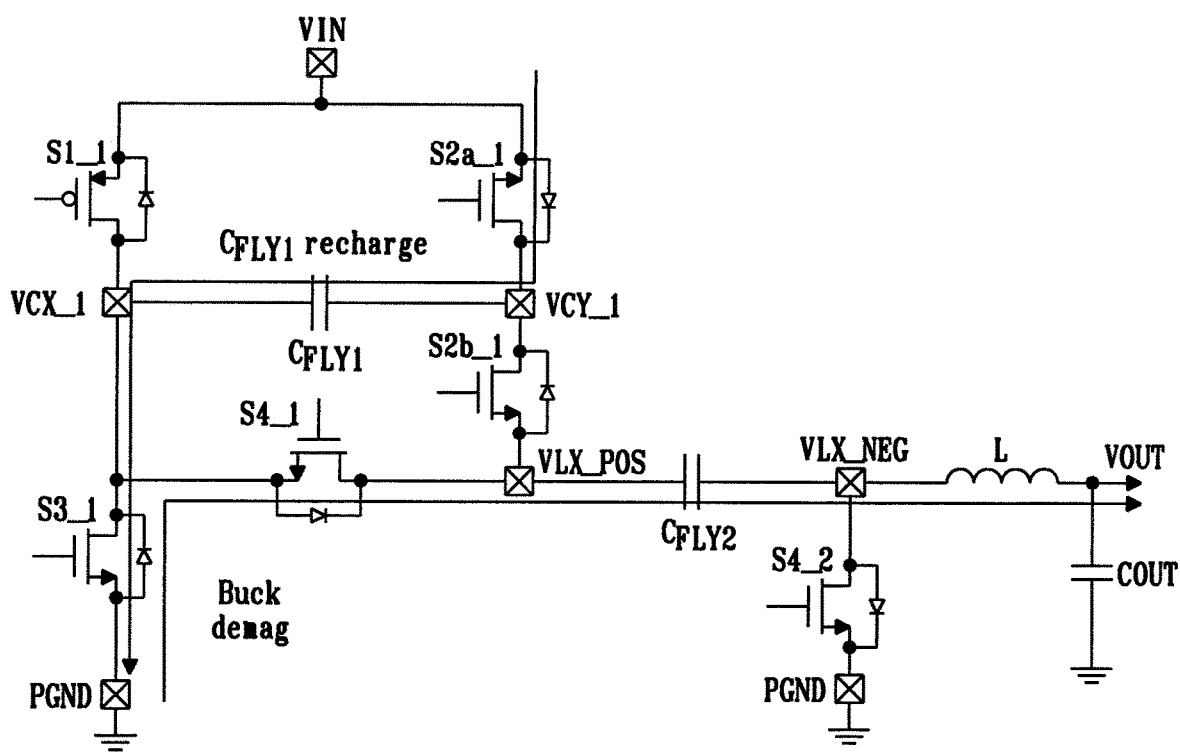
FIG. 19 shows an inverting buck boost demagnetization phase.
Figure 20:
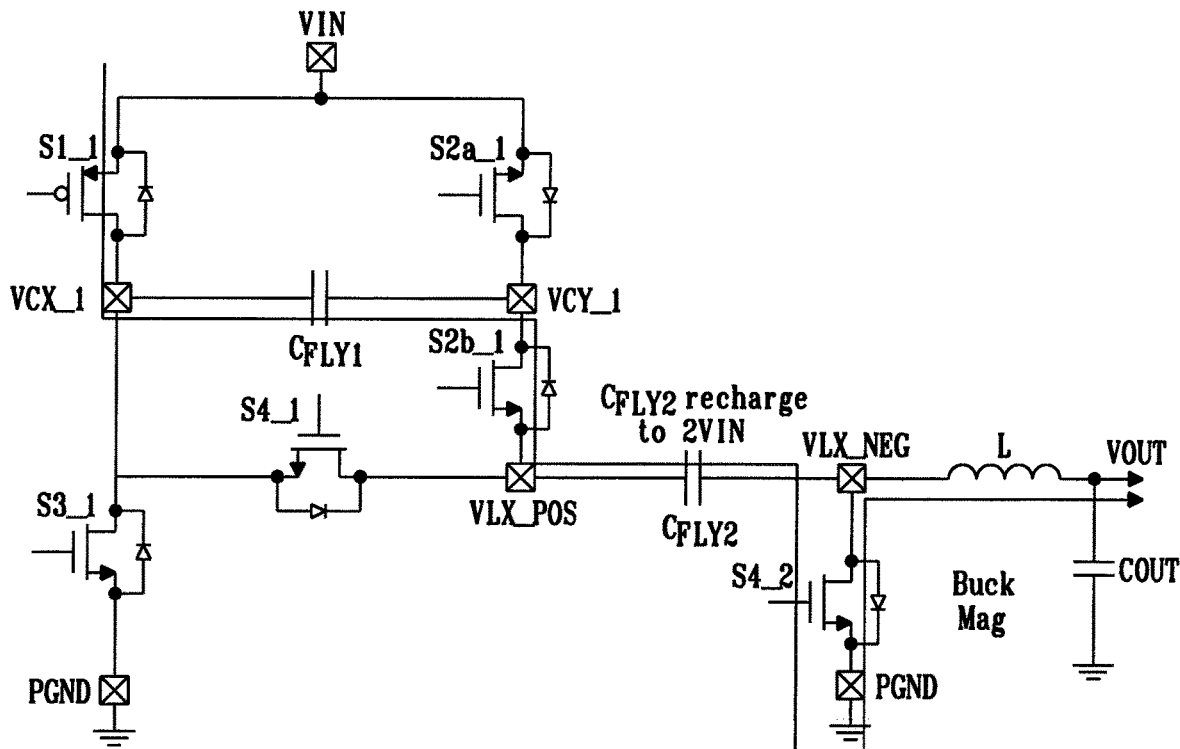
FIG. 20 shows an inverting buck boost magnetizing phase with $C_{FLY2}$ recharged to $2V_{IN}$.
Figure 21:
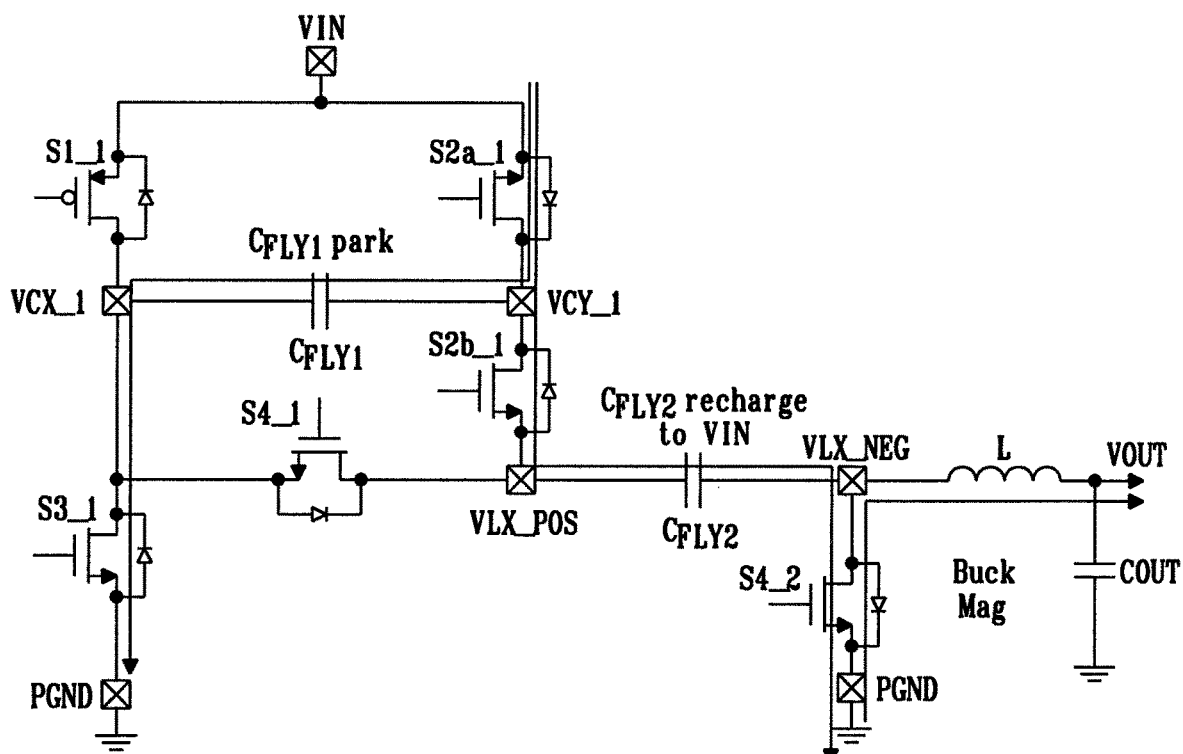
FIG. 21 shows an inverting buck boost magnetizing phase with $C_{FLY1}$ and $C_{FLY2}$ charged to $V_{IN}$.

The presented hybrid buck-boost converters can be used as first stage of an inverting buck boost converter. In order to generate an output voltage $V_{OUT}$ having opposite polarity with respect to the input voltage $V_{IN}$, an inverting stage can be cascaded to both new hybrid (see FIG. 7) and new hybrid variant (see FIG. 11) topologies. FIG. 14 shows a hybrid buck-boost converter cascaded with an inverting stage to generate an output voltage $V_{OUT}$ having opposite polarity w.r.t. input voltage $V_{IN}$. FIG. 15 shows new hybrid buck-boost variant cascaded with an inverting stage to generate an output voltage $V_{OUT}$ having opposite polarity w.r.t. input voltage $V_{IN}$.

FIGS. 14 and 15 show how an inverting buck-boost can be implemented using the new hybrid and its variant, respectively. In both converters, the flying capacitor $C_{FLY1}$ is used to recharge the flying capacitor $C_{FLY2}$ either to $2V_{IN}$ or to $V_{IN}$ (theoretically). Once $C_{FLY2}$ is replenished, the node VLX_POS is connected to PGND through switch S4_1 and switches S4_1, S3_1, in new hybrid buck boost operation and new hybrid variant, respectively. Therefore, the node VLX_NEG goes below PGND to $-V_{CFLY2}$ voltage.

The operating phases of these topologies are described in FIGS. 16 to 21.

The negative converters support two operating modes:
1. VLX_NEG moves between $-2V_{IN}$ and PGND.
    Converters cycle between phase (a) and (b) described in FIGS. 16 to 18 and FIGS. 19 to 21 for new hybrid and new hybrid variant, respectively.
2. VLX_NEG moves between $-V_{IN}$ and PGND.
    Converters cycle between phase (a) and (c) described in FIGS. 16 to 18 and FIGS. 19 to 21 for new hybrid and new hybrid variant, respectively.

The proposed converters have the option of operating either in mode 1 or in mode 2. An operation involving both modes would cause a large charge redistribution on the flying capacitor $C_{FLY2}$ used to bring VLX_NEG below PGND (i.e. in the same switching cycle $C_{FLY2}$ would be charged and discharged from $2V_{IN}$ to $V_{IN}$ or vice versa).

Multi-Stage Operation

Both the topologies of FIGS. 7 and 11 can be configured as an N-stage converter by replicating N-times the fundamental cell. The maximum achievable output voltage can be increased by increasing the number of instantiated stages. The theoretical maximum $V_{OUT}$ is $(N+1)V_{IN}$ for an N-stage topology.

Figure 22:
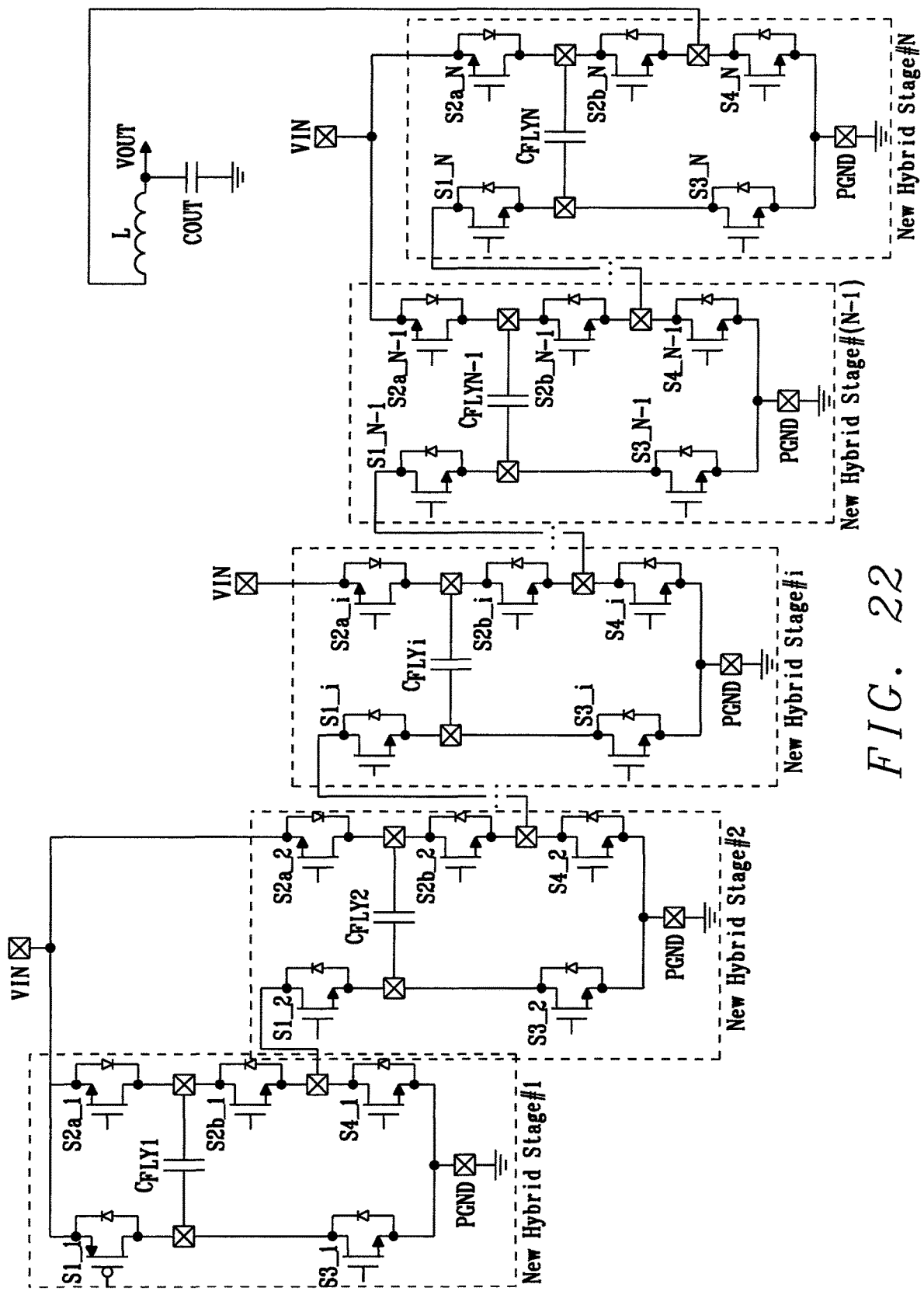
FIG. 22 shows a multi-stage new hybrid topology consisting of N cascaded stages.

The N-Stage New Hybrid converter consists of N instances of the New Hybrid converter connected as shown in FIG. 22. The i-th stage consists of the switching cell described in FIG. 7 together with the flying capacitor CFLYi. Each switching cell comprises five switching elements and a flying capacitor. The i-th stage is connected to stage (i−1)-th and stage (i+1)-th as follows:

The switch S1_i is connected to VLX (i−1) node such that the flying capacitors could be operated in series to lift VLX_N voltage up to $(N+1)V_{IN}$ The switches S2a_i and S3_i are connected to VIN and to PGND, respectively, in order to provide a recharge path to CFLYi.

The switch S2b_i is still used to split VCY_i (i.e. bottom plate of CFLYi) and VLX_i nodes.

The switch S4_i is connected to PGND. It allows the VLX_i node to goes to PGND.

It should be noted that the switches S1_i (with i>1) and S2b_i are always operated together. It means that the i-th (with i>1) stage may avoid using S1_i and directly connect VLX_(i−1) to VCX_i for the operating modes described before. In addition, switch S4_i may be instantiated only at the last stage N-th in order to provide a connection between the output node of the converter and PGND. Alternatively, switch S4_$i$ can be used to connect the output node VLX_N to the series of flying capacitors from i-th to N-th stages, for the operating modes described before.

Figure 23:
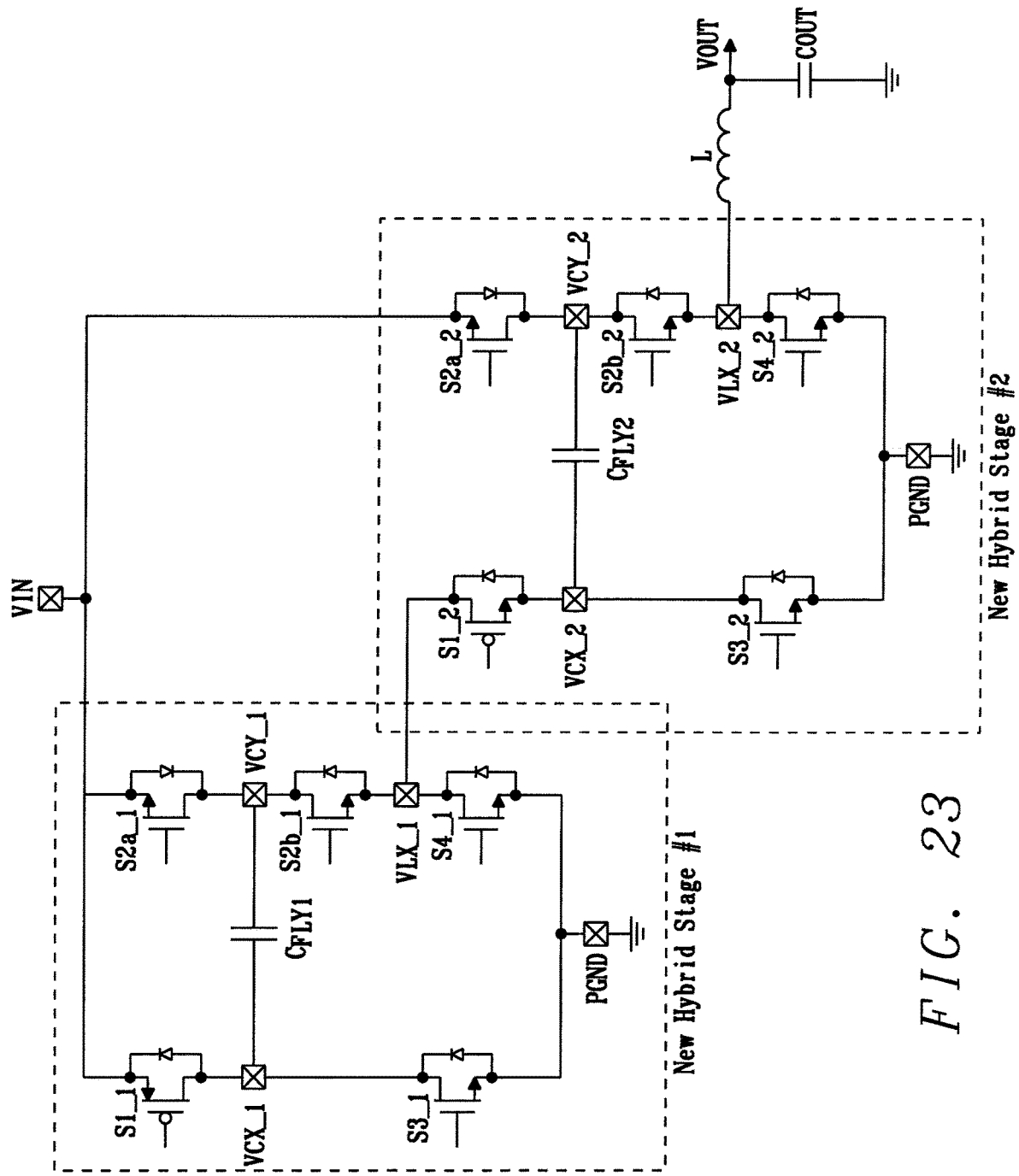
FIG. 23 shows a dual stage new hybrid converter.

An example of multi-stage New Hybrid Buck-Boost Converter having 2 stages, i.e. Dual-Stage New Hybrid Buck-Boost Converter, is shown in FIG. 23.

The theoretical maximum $V_{OUT}$ achievable by this configuration is $3V_{IN}$.

The different operating phases are described in FIGS. 24 to 27.

Figure 24:
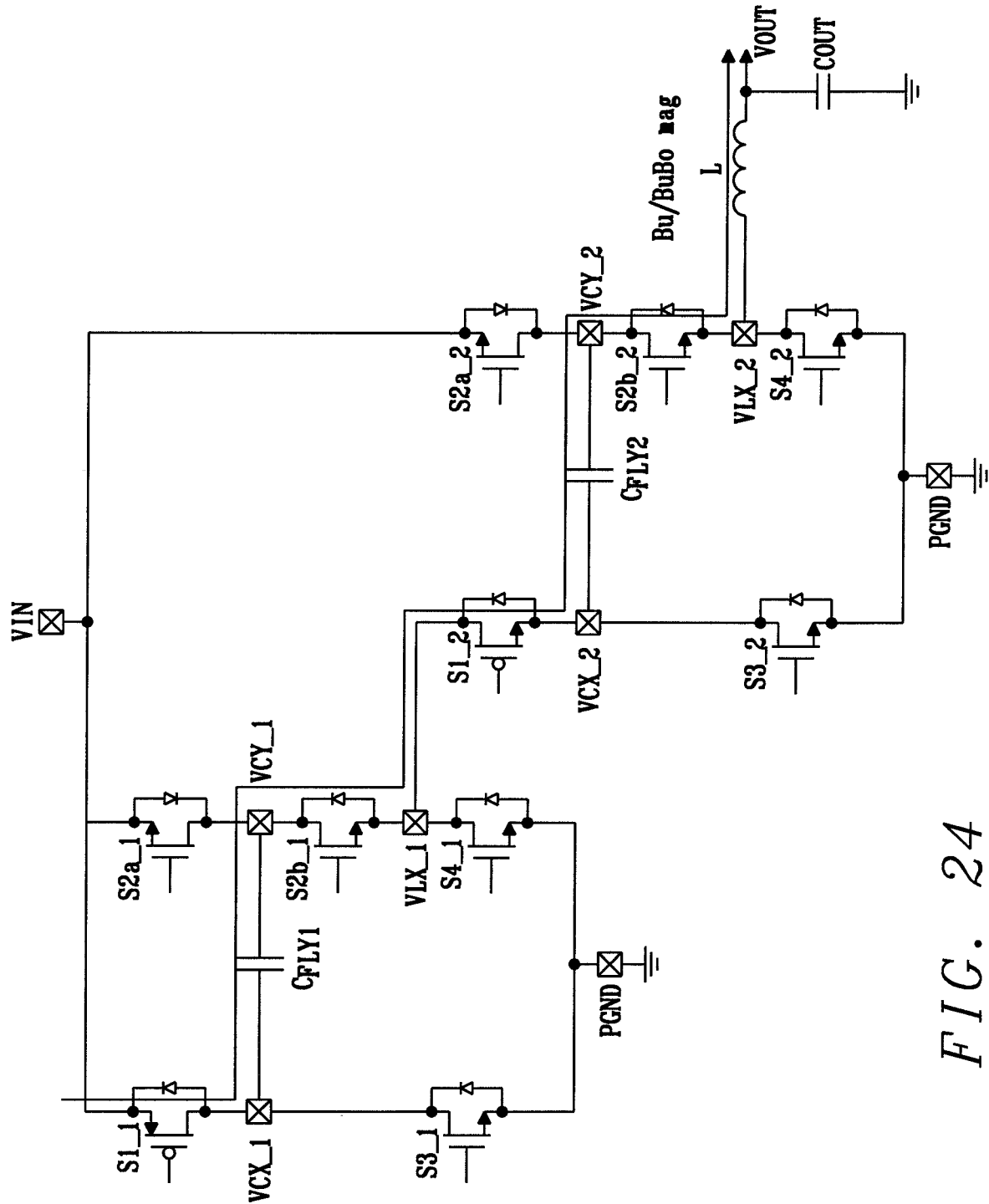
FIG. 24 shows Boost/Buck-Boost magnetizing phases of a dual stage converter.
Figure 25:
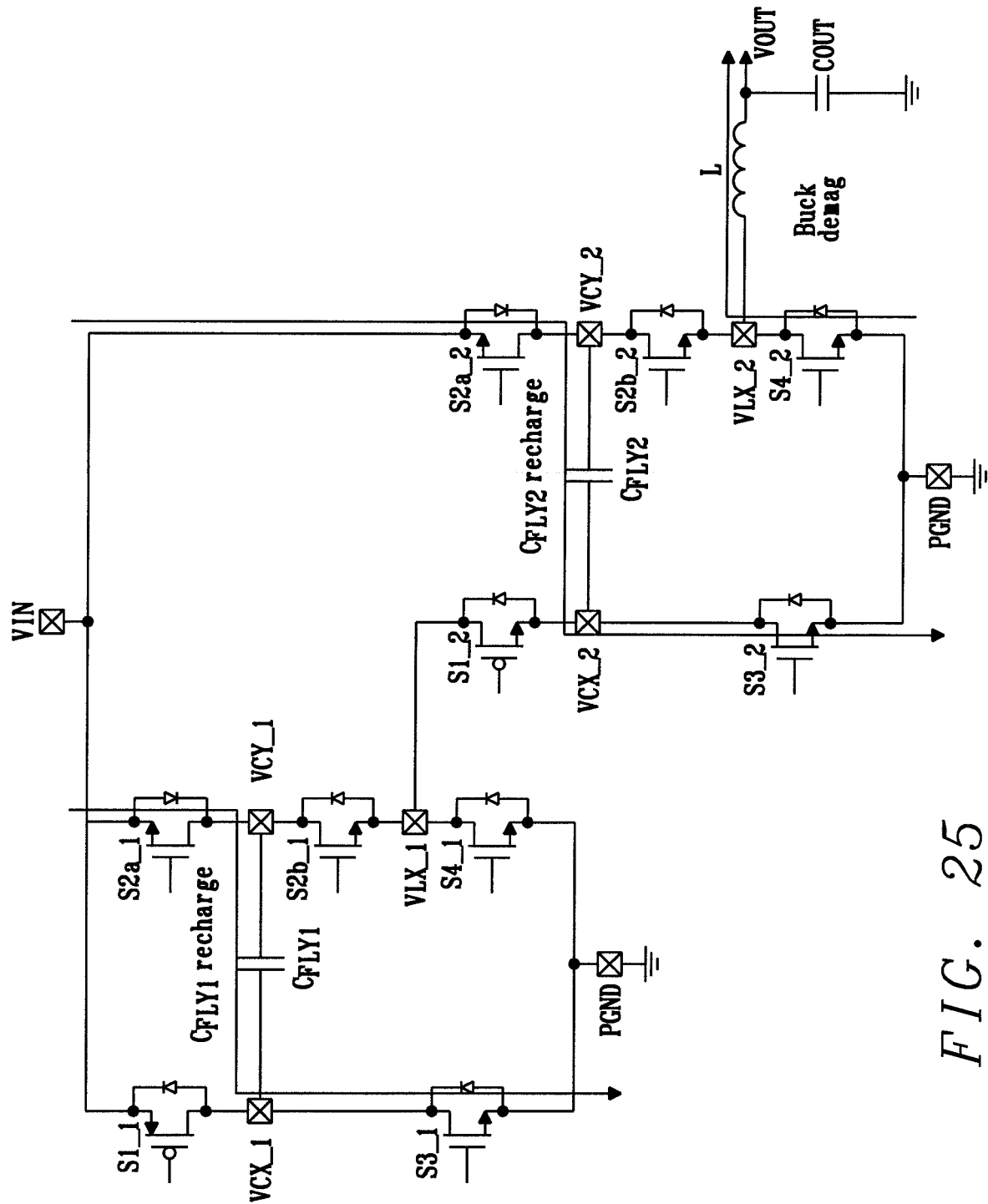
FIG. 25 shows a Buck demagnetizing phase of a dual stage converter.
Figure 26:
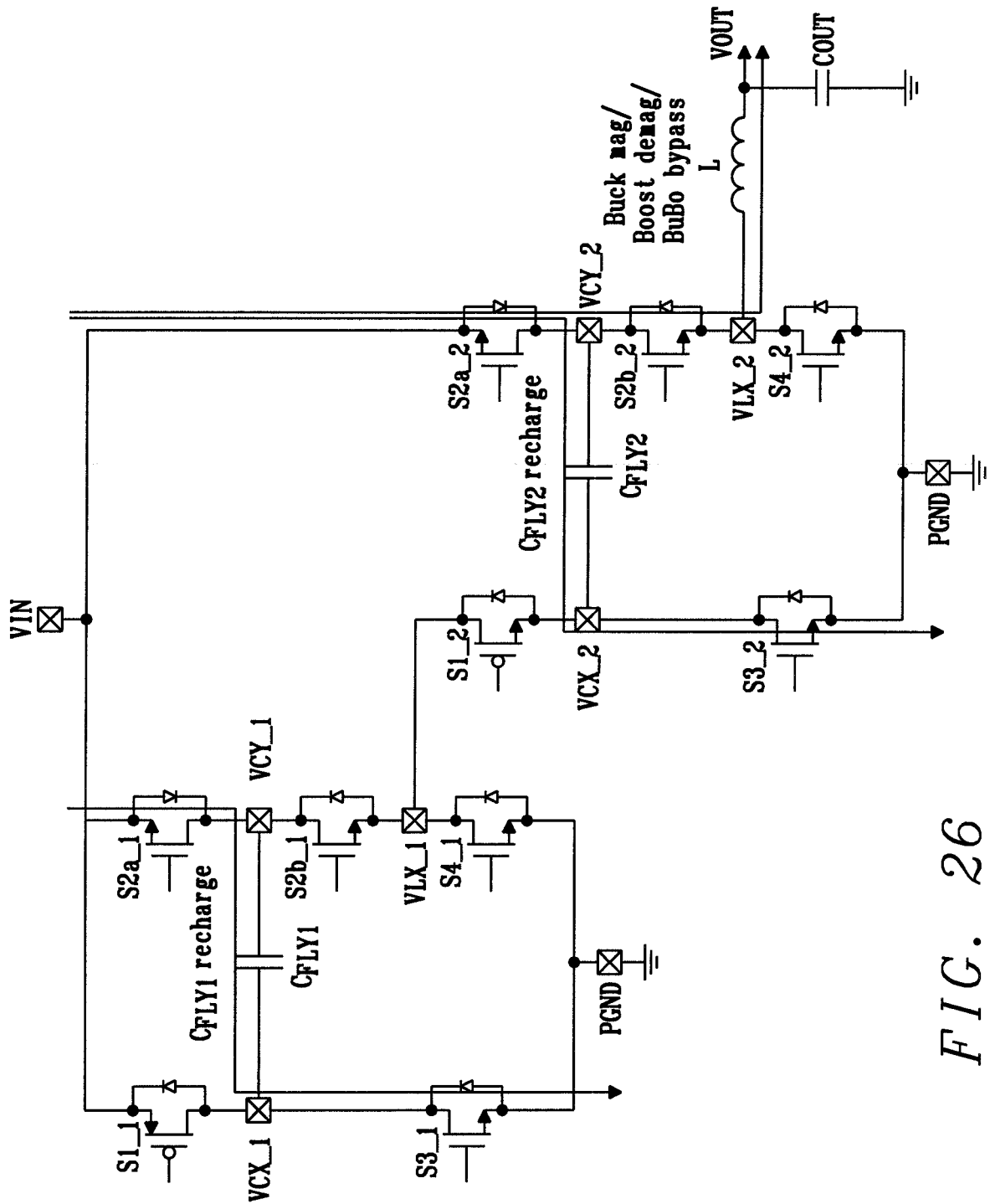
FIG. 26 shows a Buck magnetizing/Buck-Boost bypass/Boost demagnetizing phase of a dual stage converter.
Figure 27:
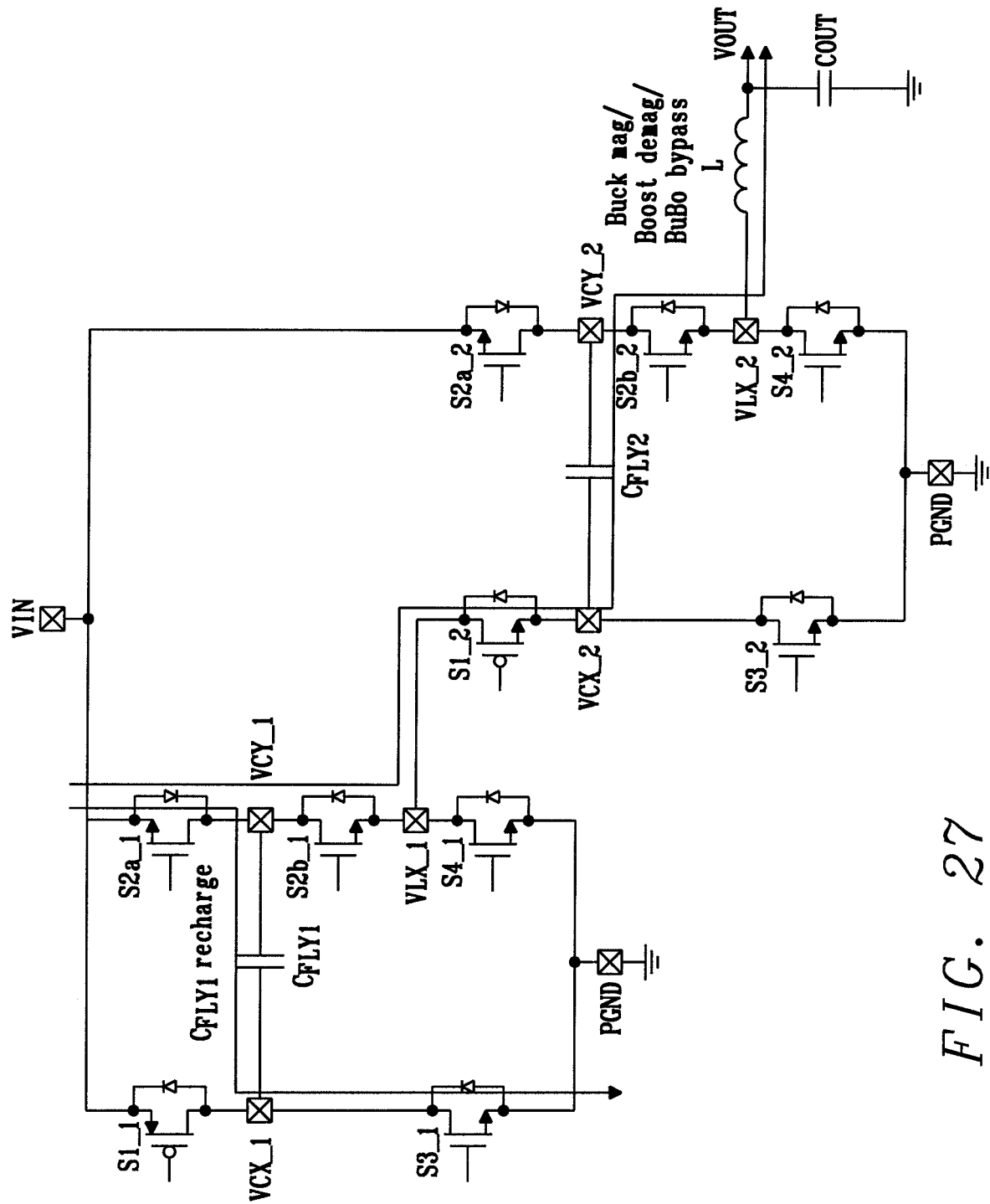
FIG. 27 shows a Boost magnetizing phase/Buck-Boost bypass/boost demagnetizing phase of a dual stage converter.

They consist of:
- Boost magnetizing phase through both $C_{FLY1}$ and $C_{FLY2}$ as shown in FIG. 24. This phase is used to lift the node VLX_2 ideally at $3V_{IN}$ voltage level,
- Buck demagnetizing phase through S4_2 switch—FIG. 25. This phase is used to connect the node VLX_2 to PGND.
- Buck magnetizing/Boost demagnetizing/Buck-Boost bypass phase according to the target $V_{OUT}$—FIG. 26. This phase is used to lift the node VLX_2 at $V_{IN}$ voltage level
- Buck magnetizing/Boost demagnetizing/Buck-Boost bypass phase through $C_{FLY2}$—FIG. 27. This phase is used to lift the node VLX_2 ideally at $3V_{IN}$ voltage level As observed before, switches S2$b$_1 and S1_2 are operated together therefore S1_2 can be removed. Moreover, switch S4_1 is not used by any of the considered phases, thus the VLX_2 node is connected to PGND through the switch S4_2.

Figure 28:
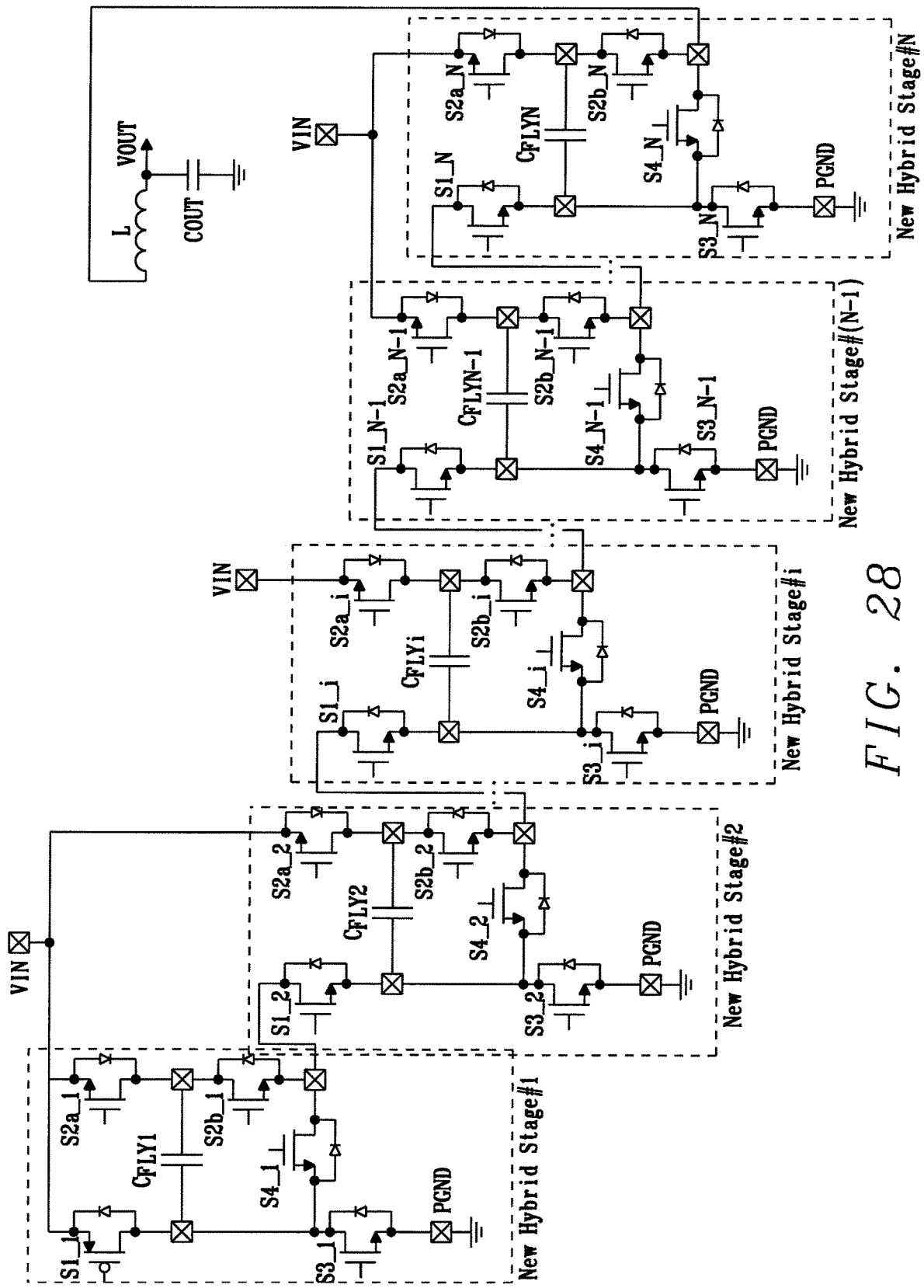
FIG. 28 shows a Multi-Stage New Hybrid topology consisting of N cascaded stages.

The same considerations can be extended to New Hybrid variant. FIG. 28 shows how N switching cells are connected in order to create an N-stage converter. In essence, FIG. 28 shows N stages of the converter design of FIG. 11 comprising five switching elements and a flying capacitor.

Figure 29:
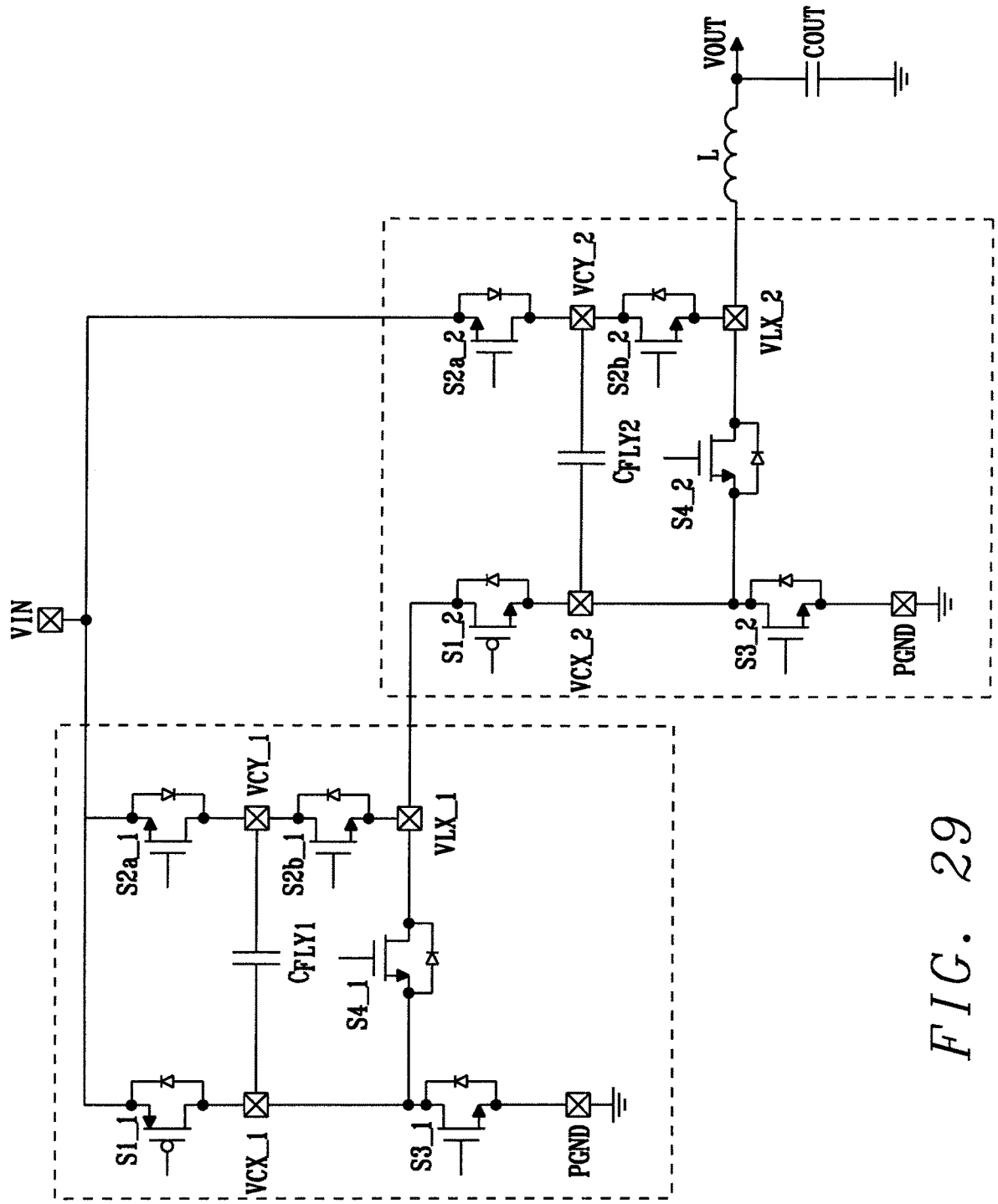
FIG. 29 shows a Dual Stage New Hybrid Variant Converter.
Figure 30:
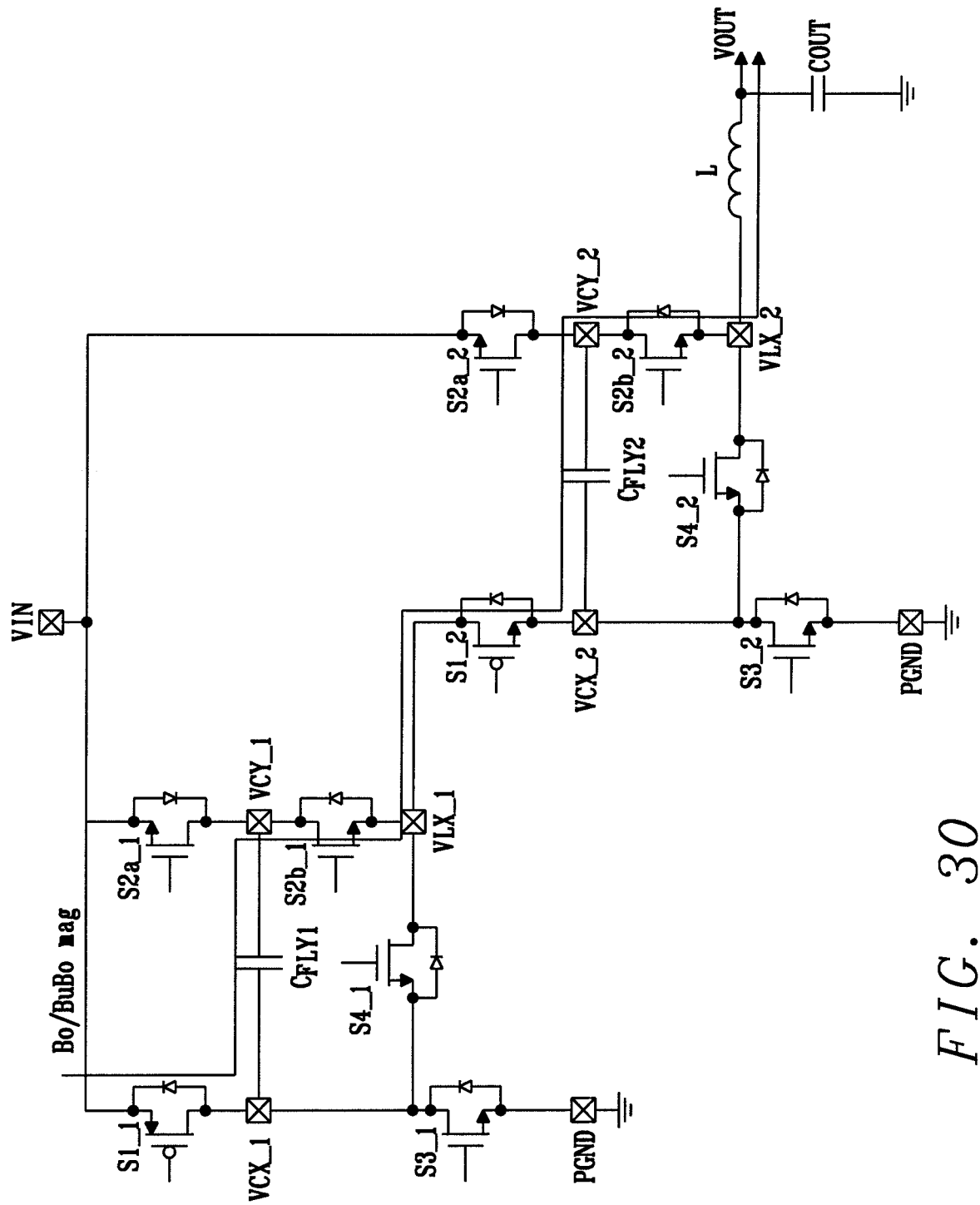
FIG. 30 shows a Boost/Buck Boost magnetizing phases of a Dual-Stage New Hybrid Variant Converter.
Figure 31:
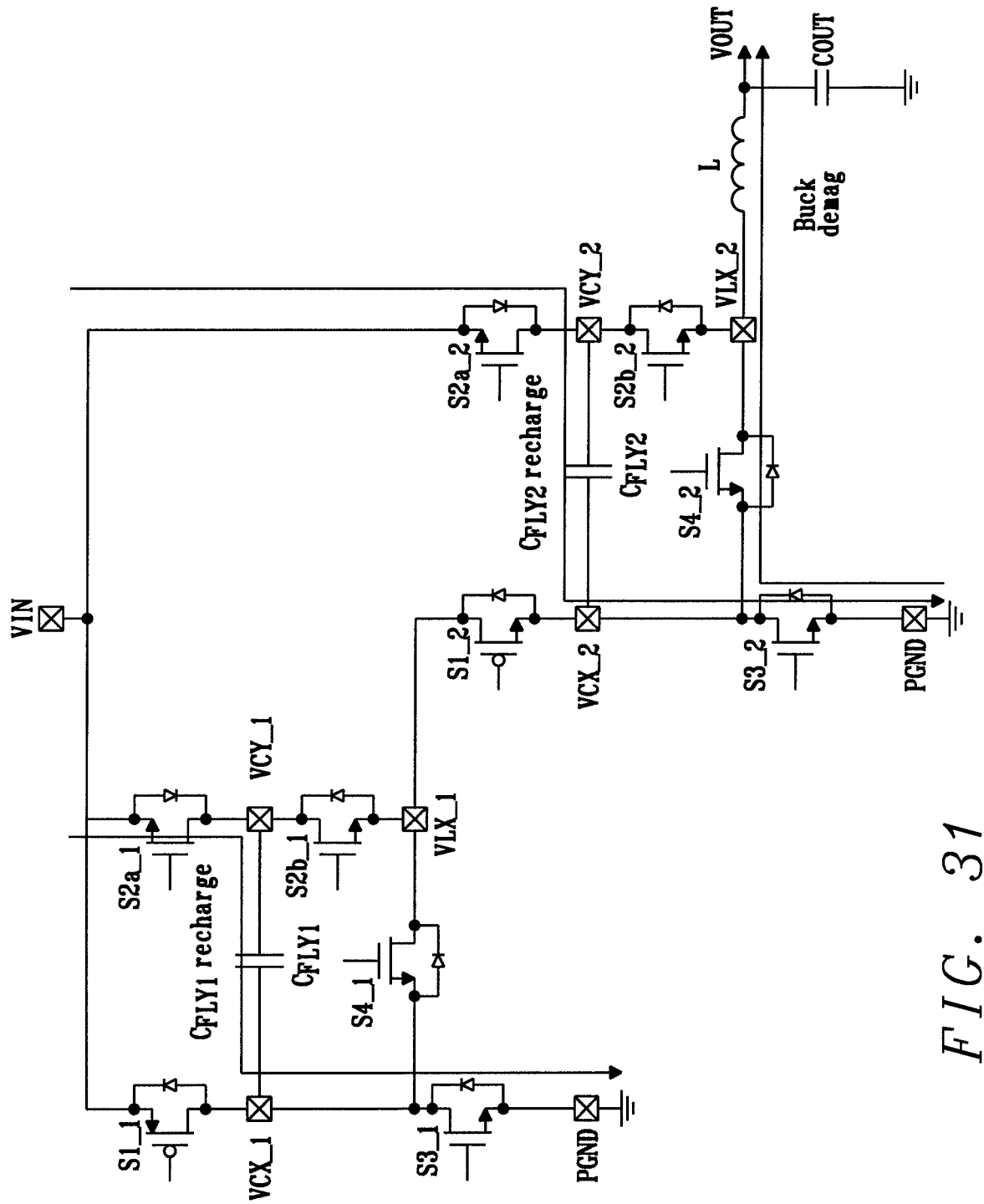
FIG. 31 shows a Buck demagnetizing phase of a Dual-Stage New Hybrid Variant Converter.
Figure 32:
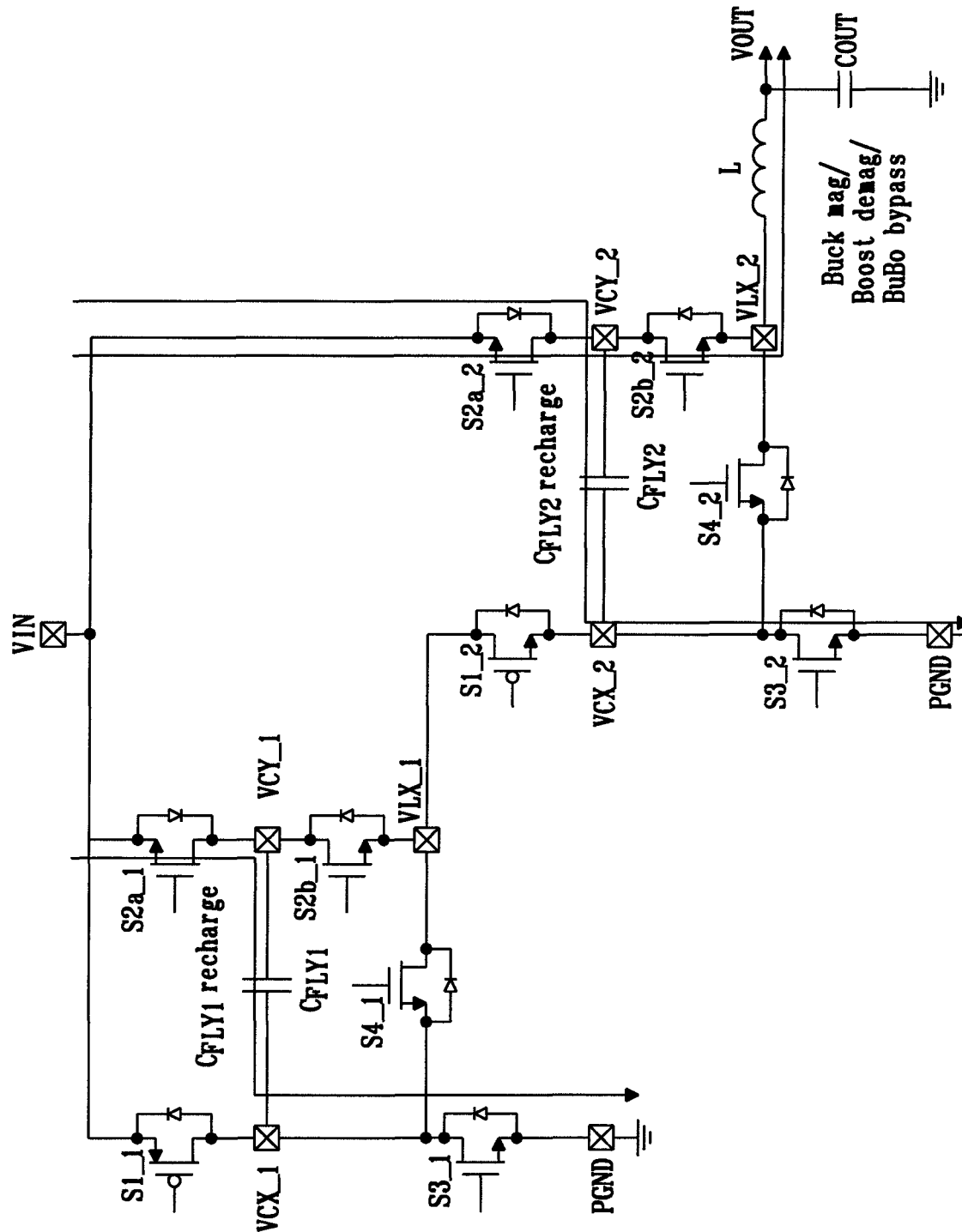
FIG. 32 shows a Buck magnetizing/Buck-Boost bypass/Boost demagnetizing phase of a Dual-Stage New Hybrid Variant Converter.
Figure 33:
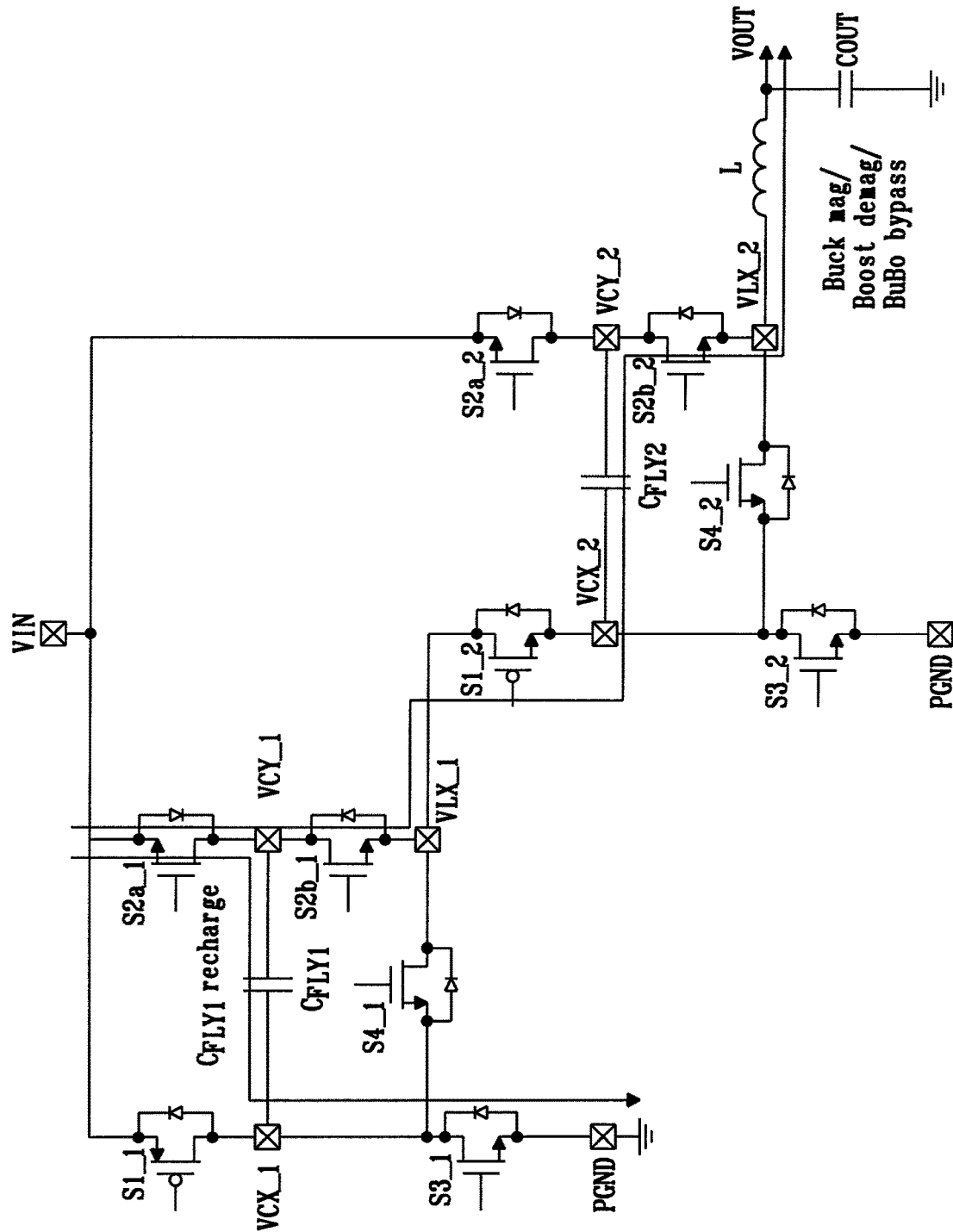
FIG. 33 shows a Boost magnetizing phase/Buck-Boost bypass/boost demagnetizing phase of a Dual-Stage New Hybrid Variant Converter.

As previously explained for the new hybrid converter, a Dual-Stage hybrid variant—depicted in FIG. 29—is considered as an example to present the possible operating phases. The operating modes may be the same to those presented for Multi-Stage hybrid buck-boost previously, see FIGS. 30 to 33.

Programmable Multi-Stage—New Phases Sequence

The Multi-Stage architecture can be programmed to achieve different output voltage according to the number of flying capacitors involved in inductor magnetization phase.

Assume that all the flying capacitors are ideally charged up to $V_{IN}$.

For a given $V_{OUT}$ value, such that $(N-(k-1))V_{IN}<V_{OUT}<(N-(k-1)+1)V_{IN}$ (with $1 \leq k \leq N$), the Programmable N-Stage converter may cycle between two voltage level at VLX_N node in boost mode:
- $(N-(k-1))V_{IN}$ for inductor demagnetizing phase
- $(N-(k-1)+1)V_{IN}$ for inductor magnetizing phase In order to park the first k−1 flying capacitors and use the remaining N−(k−1), the switches S2$a$_k−1 and S2$b$_k−1 must be both closed to provide a connection between the input voltage $V_{IN}$ and the flying capacitor of the next stage k. This phase is able to lift the VLX_N node up to $(N-(k-1)+1)V_{IN}$.

In Buck-Boost operation, the bypass phase is achieved by connecting the N−(k−1) flying capacitors in series and by connecting switch S4_$i$ to PGND (and through both switches S4_$i$ and S3_$i$ for the hybrid variant). Therefore, switch S4_$i$ is instantiated in each stage in order to connect a k-th flying capacitor to PGND. In this switching configuration the VLX_N node voltage level goes to $(N-(k-1))V_{IN}$.

In addition, during the buck demagnetizing phase the flying capacitors are recharged. In this phase the VLX_N node may be connected either to PGND or to $V_{IN}$ while the CFLYs are recharged using switches S2$a$_$i$ and S3_$i$, with $k \leq i \leq N$.

Both Multi-Stage and Programmable Multi-Stage solutions can be cascaded with an inverting stage to create an inverting hybrid buck-boost as shown before.

Figure 34:
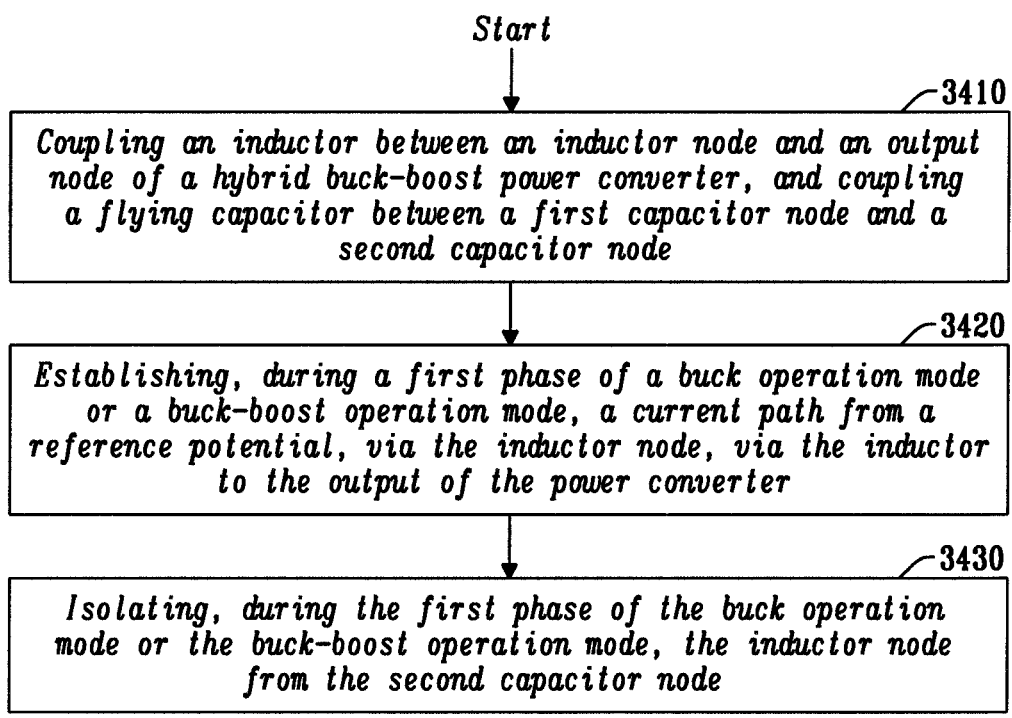
FIG. 34 shows a flowchart of a method for operating a hybrid buck-boost power converter.

FIG. 34 shows a flowchart of a method for operating a hybrid buck-boost power converter. The steps include 3410, coupling an inductor between an inductor node and an output node of the power converter, and a flying capacitor between a first capacitor node and a second capacitor node. The steps also include 3420, establishing, during a first phase of a buck operation mode or a buck-boost operation mode, a current path from a reference potential, via the inductor node, via the inductor to the output of the power converter. The steps also include 3430, isolating, during the first phase of the buck operation mode or the buck-boost operation mode, the inductor node from the second capacitor node.

It should be noted that the description and drawings merely illustrate the principles of the proposed methods and systems. Those skilled in the art will be able to implement various arrangements that, although not explicitly described or shown herein, embody the principles of the invention and are included within its spirit and scope. Furthermore, all examples and embodiment outlined in the present document are principally intended expressly to be only for explanatory purposes to help the reader in understanding the principles of the proposed methods and systems. Furthermore, all statements herein providing principles, aspects, and embodiments of the invention, as well as specific examples thereof, are intended to encompass equivalents thereof.

What is claimed is:

1. A power converter configured to receive an input voltage at an input node of the power converter and to generate an output voltage at an output node of the power converter, the power converter comprising:
   an inductor coupled between an inductor node and the output node,
   a flying capacitor coupled between a first capacitor node and a second capacitor node,
   a first switching element coupled between the input node and the first capacitor node,
   a second switching element coupled between the second capacitor node and the inductor node,
   a third switching element coupled between the input node and the second capacitor node,
   a fourth switching element coupled between the first capacitor node and a reference potential, and
   a fifth switching element coupled between the inductor node and the first capacitor node, such that the fourth switching element and the fifth switching element form a series connection between the inductor node and the reference potential.

2. The power converter according to claim 1, wherein the power converter is configured to, during a first phase of a buck operation mode, open the second switching element such that the second capacitor node is isolated from the inductor node.

3. The power converter according to claim 2, wherein the power converter is configured to, during a second phase of the buck operation mode, establish a current path from the input node via the inductor to the output node, and a current path from the input node via the flying capacitor to a reference potential.

4. The power converter according to claim 1, wherein the power converter is configured to, during a first phase of a boost operation mode, establish a current path from the input node via the flying capacitor and via the inductor to the output node.

5. The power converter according to claim 4, wherein the power converter is configured to, during a second phase of the boost operation mode, establish a current path from the input node via the inductor to the output node, and a current path from the input node via the flying capacitor to a reference potential.

6. The power converter according to claim 1, wherein the power converter is configured to, during a first phase of a buck-boost operation mode, establish a current path from the input node via the flying capacitor and via the inductor to the output node.

7. The power converter according to claim 6, wherein the power converter is configured to, during a second phase of the buck-boost operation mode, establish a current path from the input node via the inductor to the output node, and a current path from the input node via the flying capacitor to a reference potential.

8. The power converter according to claim 6, wherein the power converter is configured to, during a third phase of the buck-boost operation mode, establish a current path from a reference potential via the inductor to the output node, and a current path from the input node via the flying capacitor to the reference potential.

9. The power converter according to claim 1, wherein the power converter is configured to use the second switching element for sensing a current through the inductor.

10. A method for operating a power converter, the power converter comprising an inductor coupled between an inductor node and an output node of the power converter, and a flying capacitor coupled between a first capacitor node and a second capacitor node, the method comprising:
    establishing, during a first phase of a buck operation mode or a buck-boost operation mode, a current path from a reference potential, via the inductor node, via the inductor to the output of the power converter,
    isolating, during said first phase of the buck operation mode or the buck-boost operation mode, the inductor node from the second capacitor node,
    coupling a third switching element between the input node and the second capacitor node,
    coupling a fourth switching element between the first capacitor node and a reference potential, and
    coupling a fifth switching element between the inductor node and the first capacitor node, such that the fourth switching element and the fifth switching element form a series connection between the inductor node and the reference potential.

11. The method according to claim 10, further comprising coupling a first switching element between the input node and the first capacitor node,
and wherein isolating the inductor node from the second capacitor node comprises
    opening a second switching element which is coupled between the inductor node and the second capacitor node.

12. The method according to claim 10, further comprising
establishing, during a second phase of the buck operation mode, a current path from the input node via the inductor to the output node, and a current path from the input node via the flying capacitor to a reference potential.

13. The method according to claim 10, comprising
establishing, during a first phase of a boost operation mode, a current path from the input node via the flying capacitor and via the inductor to the output node.

14. The method according to claim 13, further comprising
establishing, during a second phase of the boost operation mode, a current path from the input node via the inductor to the output node, and a current path from the input node via the flying capacitor to a reference potential.

15. The method according to claim 10, comprising
establishing, during the first phase of the buck-boost operation mode, a current path from the input node via the flying capacitor and via the inductor to the output node.

16. The method according to claim 15, further comprising
establishing, during a second phase of the buck-boost operation mode, a current path from the input node via the inductor to the output node, and a current path from the input node via the flying capacitor to a reference potential.

17. The method according to claim 15, further comprising
establishing, during a third phase of the buck-boost operation mode, a current path from a reference potential via the inductor to the output node, and a current path from the input node via the flying capacitor to the reference potential.

18. The method according to claim 10, comprising
sensing a current through the inductor by using the second switching element.

* * * * *